US009584238B2

(12) United States Patent
Väre et al.

(10) Patent No.: US 9,584,238 B2
(45) Date of Patent: Feb. 28, 2017

(54) ACCESSING SERVICE GUIDE INFORMATION IN A DIGITAL VIDEO BROADCAST SYSTEM

(75) Inventors: Jani Petteri Väre, Kaarina (FI); Jyrki Tapio Alamaunu, Turku (FI); Reino Juhani Hiltunen, Merimasku (FI); Juhani Huttunen, Veikkola (FI)

(73) Assignee: Nokia Corporation, Espoo (FI)

( * ) Notice: Subject to any disclaimer, the term of this patent is extended or adjusted under 35 U.S.C. 154(b) by 181 days.

(21) Appl. No.: 13/168,087

(22) Filed: Jun. 24, 2011

(65) Prior Publication Data

US 2012/0331508 A1  Dec. 27, 2012

(51) Int. Cl.
| | |
|---|---|
| G06F 3/00 | (2006.01) |
| G06F 13/00 | (2006.01) |
| H04N 5/445 | (2011.01) |
| H04H 60/73 | (2008.01) |
| H04N 21/231 | (2011.01) |
| H04N 21/236 | (2011.01) |
| H04N 21/2362 | (2011.01) |
| H04N 21/434 | (2011.01) |
| H04N 21/643 | (2011.01) |

(Continued)

(52) U.S. Cl.
CPC ........... *H04H 60/73* (2013.01); *H04H 60/72* (2013.01); *H04L 65/4076* (2013.01); *H04N 21/2362* (2013.01); *H04N 21/23109* (2013.01); *H04N 21/23614* (2013.01); *H04N 21/4345* (2013.01); *H04N 21/4348* (2013.01); *H04N 21/64315* (2013.01)

(58) Field of Classification Search
CPC combination set(s) only.
See application file for complete search history.

(56) References Cited

U.S. PATENT DOCUMENTS

| | | | |
|---|---|---|---|
| 6,018,528 A * | 1/2000 | Gitlin et al. | 370/436 |
| 2006/0084435 A1 | 4/2006 | Borsos et al. | |

(Continued)

FOREIGN PATENT DOCUMENTS

| | | |
|---|---|---|
| EP | 2134093 | 12/2009 |
| EP | 2154810 | 2/2010 |

(Continued)

OTHER PUBLICATIONS

Md. Sarwar Morshed, Synchronization Performance in DVB-T2 system.*

(Continued)

*Primary Examiner* — Nasser Goodarzi
*Assistant Examiner* — Fred Peng
(74) *Attorney, Agent, or Firm* — Banner & Witcoff, Ltd.

(57) ABSTRACT

Apparatuses may perform and methods may include receiving a digital broadcast signal that includes a physical layer pipe identified by a predetermined identifier indicating that the physical layer pipe includes service guide bootstrap information. The bootstrap information may identify one or more service guides available for download. The physical layer pipe may include header information that identifies one or more other physical layer pipes containing portions of the service guides identified in the bootstrap information. Based on the bootstrap information and header information, a selected service guide is retrieved and presented to a user.

24 Claims, 28 Drawing Sheets

(51) Int. Cl.
H04L 29/06 (2006.01)
H04H 60/72 (2008.01)

(56) References Cited

U.S. PATENT DOCUMENTS

| | | | |
|---|---|---|---|
| 2007/0045416 | A1 | 3/2007 | Paila et al. |
| 2008/0127286 | A1* | 5/2008 | Kim ............................... 725/105 |
| 2008/0225778 | A1 | 9/2008 | Vare et al. |
| 2009/0064244 | A1* | 3/2009 | Shin et al. .................... 725/100 |
| 2009/0077585 | A1 | 3/2009 | Singhai et al. |
| 2009/0094356 | A1 | 4/2009 | Vare |
| 2009/0103649 | A1 | 4/2009 | Vare et al. |
| 2009/0187949 | A1 | 7/2009 | Vare et al. |
| 2009/0203326 | A1 | 8/2009 | Vesma et al. |
| 2009/0291631 | A1* | 11/2009 | Xue et al. .................... 455/3.01 |
| 2009/0318151 | A1 | 12/2009 | Jung et al. |
| 2010/0043026 | A1* | 2/2010 | De Cuetos ............ H04H 20/28 725/40 |
| 2010/0058387 | A1* | 3/2010 | De Cuetos et al. ............. 725/39 |
| 2010/0083311 | A1 | 4/2010 | Vare et al. |
| 2010/0115552 | A1* | 5/2010 | Lee et al. ....................... 725/39 |
| 2010/0180310 | A1* | 7/2010 | Lee ........................ H04H 60/72 725/54 |
| 2010/0195633 | A1 | 8/2010 | Vare et al. |
| 2010/0211977 | A1* | 8/2010 | Song et al. ...................... 725/54 |
| 2010/0262708 | A1 | 10/2010 | Bouazizi et al. |
| 2010/0283912 | A1 | 11/2010 | Sun et al. |
| 2010/0299708 | A1 | 11/2010 | Xu et al. |
| 2010/0322355 | A1 | 12/2010 | Vare et al. |
| 2011/0103300 | A1 | 5/2011 | Vare et al. |
| 2011/0119704 | A1* | 5/2011 | Aaltonen ......................... 725/34 |
| 2011/0222610 | A1* | 9/2011 | Gao et al. ................ 375/240.27 |
| 2012/0051320 | A1 | 3/2012 | Vare et al. |
| 2012/0239785 | A1* | 9/2012 | Pazos ............................ 709/219 |
| 2012/0288031 | A1 | 11/2012 | Vare et al. |
| 2013/0070161 | A1* | 3/2013 | Seo et al. ....................... 348/726 |
| 2013/0279380 | A1* | 10/2013 | Hong .................... H04H 20/72 370/310 |

FOREIGN PATENT DOCUMENTS

| | | |
|---|---|---|
| EP | 2200302 | 6/2010 |
| EP | 2207293 | 7/2010 |
| EP | 2268004 | 12/2010 |
| WO | 2011087507 | 7/2011 |

OTHER PUBLICATIONS

International Search Report and Written Opinion for PCT/FI2012/050756 mailed Nov. 13, 2012.
International Search Report and Written Opinion for PCT/FI2012/050521 mailed Oct. 15, 2012.
Faria, F., et al., DVB-H: Digital Broadcast Services to Handheld Devices, Proceedings of the IEEE, vol. 94, No. 1, pp. 194-209, Jan. 2006.
Xiaodong Y., et al., A Survey of Handover Algorithms in DVB-H, IEEE Communications Surveys & Tutorials, vol. 8, No. 44, pp. 16-29, 4th Quarter 2006.
International Search Report for PCT/FI2011/050680 dated Oct. 26, 2011.
Digital Video Broadcasting (DVB); Frame structure channel coding and modulation for a second generation digital terrestrial television broadcasting system (DVB-T2), ETSI EN 302 755 v1.1.1 (Sep. 2009), European Standard (Telecommunications series).
Digital Video Broadcasting (DVB); Transmission System for Handheld Terminals (DVB-H), ETSI EN 302 304 v1.1.1 (Nov. 2004), European Standard (Telecommunications series).
Digital Video Broadcasting (DVB); DVB specification for data broadcasting, ETSI EN 301 192 v1.5.1 (Nov. 2009), European Standard (Telecommunications series).
Digital Video Broadcasting (DVB); Framing structure, channel coding and modulation for digital terrestrial television, ETSI EN 300 744 v1.6.1 (Jan. 2009), European Standard (Telecommunications series).
Commercial Requirements for DVB-NGH DVB CM-NGH, Version 1.01.
ETSI EN 300 468 (DVB SI), V1.11.1, Digital Video Broadcasting (DVB); Specification for Service Information (SI) in DVB Systems, Apr. 2010.
International Search Report and Written Opinion for PCT/FI2012/050391 dated Oct. 4, 2012.
ETSI TS 102 471 V1.4.1, "Digital Video Broadcasting(DVB) IP Datacast over DVB-H: Electronic Service Guide (ESG)," 139 pages.
Paila, et al., "FLUTE—File Delivery over Unidirectional Transport", RFC 3926, Oct. 2004, <http://www.ietforg/rfc/rfc3926.txt>, 33 pages.
Luby, et al., "Asynchronous Layered Coding (ALC) Protocol Instantiation", RFC 3450, Dec. 2002, <http://www.ietforg/rfc/rfc3450.txt>, 32 pages.
Luby, et al., "Layered Coding Transport (LCT) Building Block", RFC 3451, Dec. 2002, <http://www.ietforg/rfc/rfc3451.txt>, 28 pages.
OMA-TS-BCAST Service Guide for Mobile Broadcast Services, Candidate Version 1.1—Sep. 14, 2010, 302 pages.
Handley, et al., "SDP—Session Description Protocol", IETF RFC 4566, Jul. 2006, <http://www.ietforg/rfc/rfc4566.txt>, 46 pages.
"Multimedia Broadcast/Multicast Service (MBMS); Protocols and codecs", 3rd Generation Partnership Project, Technical Specification 3GPP TS 26.346 Release 8, <http://www.3gpp.org/ftp/Specs/>, 2 pages.

* cited by examiner

ACCESSING SERVICE GUIDE INFORMATION IN A DIGITAL VIDEO BROADCAST SYSTEM

BACKGROUND

Communication networks, such as but not limited to wired and wireless digital broadcast networks, enable end users with electronic devices to receive digital content including video, audio, data, and so forth from various service and content providers. To communicate service and content, the network may use various standards, such as those developed by the Digital Video Broadcast (DVB) Project, which implement a layered protocol stack such as the one described by the Open Systems Interconnection (OSI) Reference Model. Within the network protocol, transport streams may be defined to encapsulate individual components of programs or other services. Such components can include, e.g., audio, video, or text components of a program or service. The network may also carry a service guide (SG), which describes for users the services and content available for subscription or purchase.

To enable electronic devices to receive, discover, and demultiplex the individual components of programs and services, including the service guide itself (also referred to as an electronic service guide (ESG)), from the transport streams, the network protocol may further include signaling information carried over the network, such as Program Specific Information (PSI) or Service Information (SI), which maps the components to locations within the transport streams.

PSI or SI signaling, however, may be insufficient in some wireless communications systems, such as Digital Video Broadcasting-Handheld (DVB-H) systems. Use of PSI or SI signaling in such systems can require a large amount of bandwidth. This can be costly, may decrease efficiency of the system, and may result in a sub-optimal end user experience.

BRIEF SUMMARY

This Summary is provided to introduce a selection of concepts in a simplified form that are further described below in the Detailed Description. This Summary is not intended to identify key features or essential features of the invention, nor is it intended to be used to limit the scope of the claims.

Methods, apparatus, and systems are presented for discovering service guide information transmitted in a broadcast network by receiving entry point information for the service guide. In various embodiments, the entry point information is included in a service guide bootstrap session carried in a predetermined and dedicated physical channel.

In further embodiments, the entry point information for the service guide may include a service guide announcement session and a service guide delivery session received in the same dedicated physical channel as the service guide bootstrap session.

In some embodiments, the service guide bootstrap session, announcement session, and delivery session may be received in a dedicated group of physical channels. In further variations, the service guide bootstrap, announcement and delivery sessions are each received in their own dedicated physical channel.

Networks in which one or more embodiments may be implemented include, but are not limited to, broadcast networks that conform to a communication broadcast protocol such as Digital Video Broadcasting-Next Generation Handheld (DVB-NGH). In some embodiments, a service guide may conform to a format such as, e.g., the Open Mobile Alliance Service Guide for Mobile Broadcast Services.

These and other embodiments are further discussed below.

BRIEF DESCRIPTION OF THE DRAWINGS

Certain embodiments are illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1A:
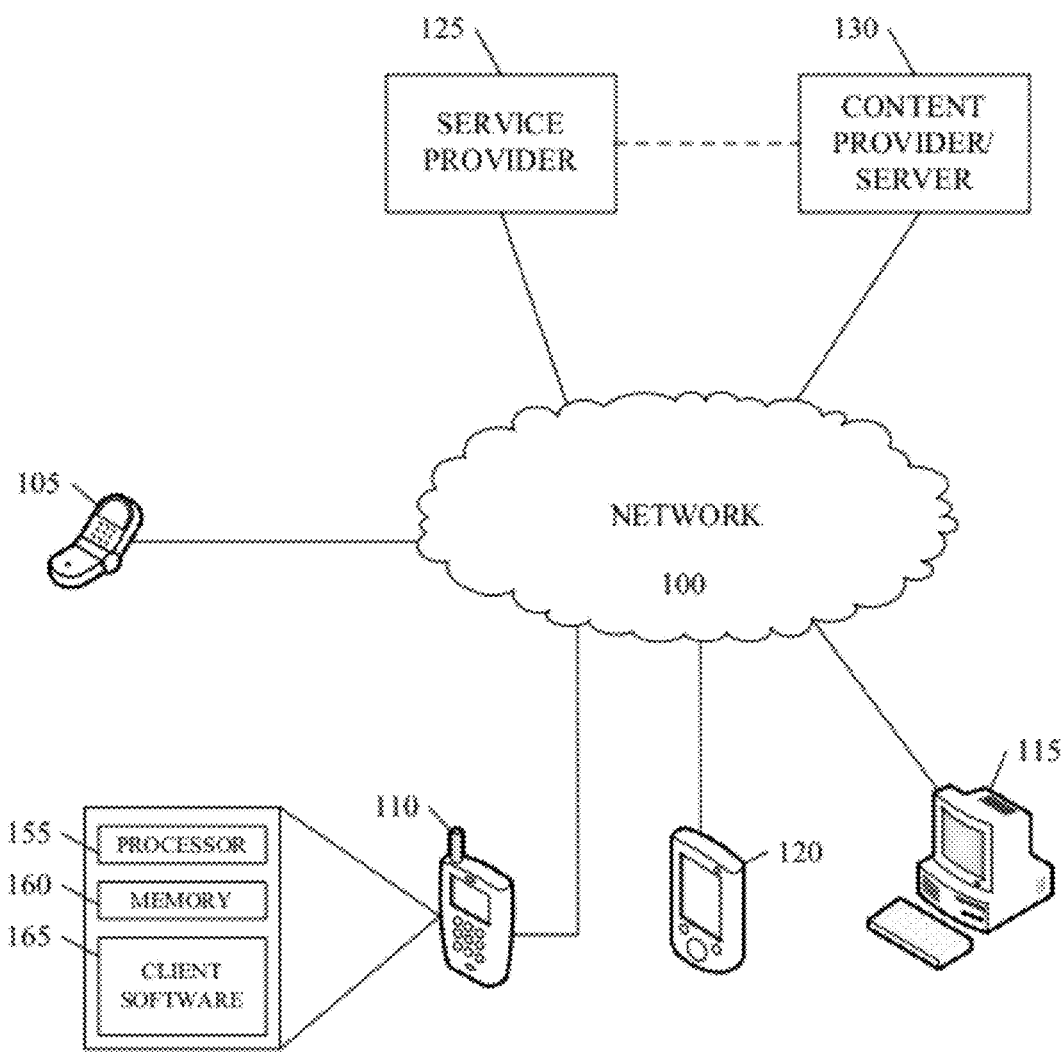
FIG. 1A is a block diagram of an example communication network in which one or more embodiments may be implemented.

FIG. 1A illustrates an example communication system through which various embodiments may be practiced. Systems, such as the systems illustrated in FIGS. 1A and 1B, may utilize a digital broadband broadcast technology, such as Digital Video Broadcast-Next Generation Handheld (DVB-NGH). Examples of other digital broadcast standards with which digital broadband broadcast systems may comply include, without limitation, Digital Video Broadcast-Terrestrial (DVB-T), Digital Video Broadcast-Second Generation Terrestrial (DVB-T2), Digital Video Broadcast-Handheld (DVB-H), Integrated Services Digital Broadcasting-Terrestrial (ISDB-T), Advanced Television Systems Committee (ATSC) Data Broadcast Standard, Advanced Television Systems Committee-Mobile/Handheld (ATSC-M/H), Digital Multimedia Broadcast-Terrestrial (DMB-T), Terrestrial Digital Multimedia Broadcasting (T-DMB), Terrestrial Digital Audio Broadcasting (T-DAB), Satellite Digital Multimedia Broadcasting (S-DMB), Terrestrial/Satellite Digital Multimedia Broadcasting (T/S-DMB), Forward Link Only (FLO), Digital Audio Broadcasting (DAB), and Digital Radio Mondiale (DRM). Other digital broadcasting standards and techniques, now known or later developed, may also be used. Embodiments of the invention may also be applicable to other systems such 3GPP MBMS (Multimedia Broadcast/Multicast Services) and 3GPP2 BCMCS (Broadcast/Multicast Service).

As seen in FIG. 1A, the system may include a number of computers and electronic devices, including mobile communication device 105, mobile phone 110, personal digital assistant (PDA) or mobile computer 120, computer work station (e.g., personal computer (PC)) 115, service provider 125 and content provider/server 130. The various devices in the system may communicate with one another and with other devices through one or more networks 100. Networks 100 may include wired and wireless connections and network elements, and connections over the networks may include permanent or temporary connections. Communication through networks 100 is not limited to the illustrated devices and may include additional mobile or fixed devices. Such additional mobile or fixed devices may include a video storage system, an audio/video player, a digital camera/camcorder, a positioning device such as a GPS (Global Positioning System) device or satellite, a television, an audio/video player, a tablet computer, a radio broadcasting receiver, a set-top box (STB), a digital video recorder, remote control devices and the like.

Although shown as a single network in FIG. 1A for simplicity, network 100 may include multiple networks that are interlinked so as to provide internetworked communications. Such networks may include one or more private or public packet-switched networks, for example the Internet, one or more private or public circuit-switched networks, for example a public switched telephone network, a cellular network configured to facilitate communications to and from mobile communication devices 105 and 110, for example through use of base stations, mobile switching centers, etc., a short or medium range wireless communication connection, for example Bluetooth®, ultra wideband (UWB), infrared, WiBree, wireless local area network (WLAN) according to one or more versions of Institute of Electrical and Electronics Engineers (IEEE) standard no. 802.11, or a high-speed wireless data network such as Evolution-Data Optimized (EV-DO) networks, Universal Mobile Telecommunications System (UMTS) networks, Long Term Evolution (LTE) networks or Enhanced Data rates for GSM Evolution (EDGE) networks. Devices 105-120 may use various communication protocols such as Internet Protocol (IP), Transmission Control Protocol (TCP), and Simple Mail Transfer Protocol (SMTP) among others known in the art. Various messaging services such as Short Messaging Service (SMS) and/or Multimedia Message Service (MMS) may also be included.

Devices 105-120 may be configured to interact with each other or other devices, such as content provider/server 130 or service provider 125. In one example, devices 105, 110, 115, and 120 may include client software 165 that is configured to coordinate the transmission and reception of information to and from content provider/server 130. In one arrangement, client software 165 may include application or server specific protocols for requesting and receiving content from content provider/server 130. For example, client software 165 may comprise a Web browser or mobile variants thereof and content provider/server 130 may comprise a web server. Billing services (not shown) may also be included to charge access or data fees for services rendered. In one arrangement where service provider 125 provides cellular and/or wireless network access, client software 165 may include instructions for access and communication through the cellular and/or wireless network. Client software 165 may be stored in computer-readable memory 160 such as read only, random access memory, writeable and rewriteable media and removable media in device 110 and may include instructions that cause one or more components—for example, processor 155, a transceiver, and a display—of device 105/110/115/120 to perform various functions and methods including those described herein.

Figure 1B:
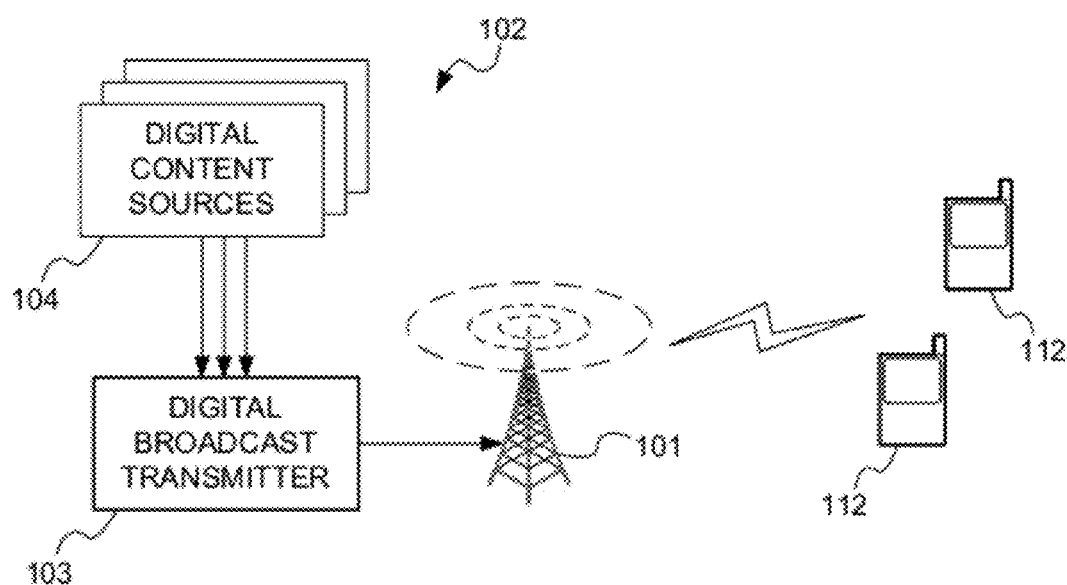
FIG. 1B is a block diagram of another example communication network in which one or more embodiments may be implemented.

FIG. 1B illustrates another example communication system 102 through which various embodiments may be practiced. Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple IP streams from multiple digital content sources 104. The processed digital content may then be passed to transmitter 101 (e.g., a digital broadcast tower), or other physical transmission component for wireless transmission. Ultimately, mobile terminals or devices 112 may selectively receive and consume digital content originating from digital content sources 104. Communication over the communication network may be bi-directional, with mobile terminals or devices 112 selectively transmitting digital content to other mobile terminals or devices 112, to digital content sources 104, or to other devices configured to receive digital content through the communication network. Devices 112 may be the same or similar to devices 105, 110, 115, and 120 in FIG. 1A.

Figure 1C:
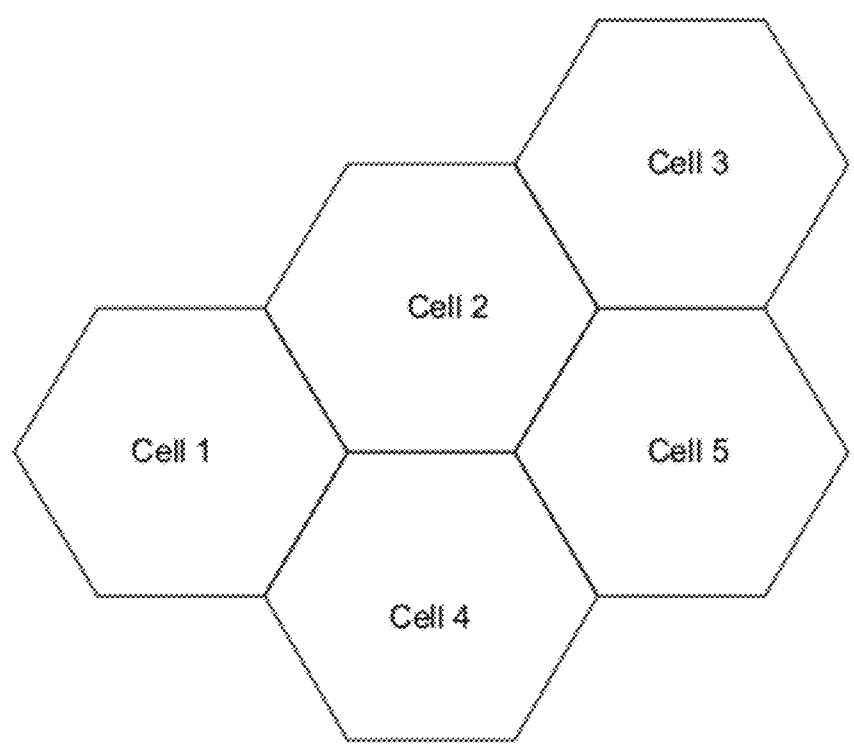
FIG. 1C illustrates an example of cells, each of which may be covered by one or more different transmitters in accordance with one or more embodiments described herein.

A communication system may be comprised of a plurality of different cells. FIG. 1C illustrates an example of cells, each of which may be covered by one or more different transmitters (e.g., transmitter 101). A cell may define a geographical area that may be covered by a transmitter. A cell may be of any size and may have neighboring cells. In the example of FIG. 1C, Cell 1 represents a geographical area that is covered by a transmitter (e.g., transmitter 101) for a communication network. Cell 2 is next to Cell 1 and represents a second geographical area that may be covered by a different transmitter. Cell 2 may, for example, be a different cell within the same network as Cell 1. Alternatively, Cell 2 may be in a network different from that of Cell 1. Cells 1, 3, 4, and 5 are neighboring cells of Cell 2, in this example. One or more of the cells are parts of systems configured to carry out one or more operations described herein.

Figure 2:
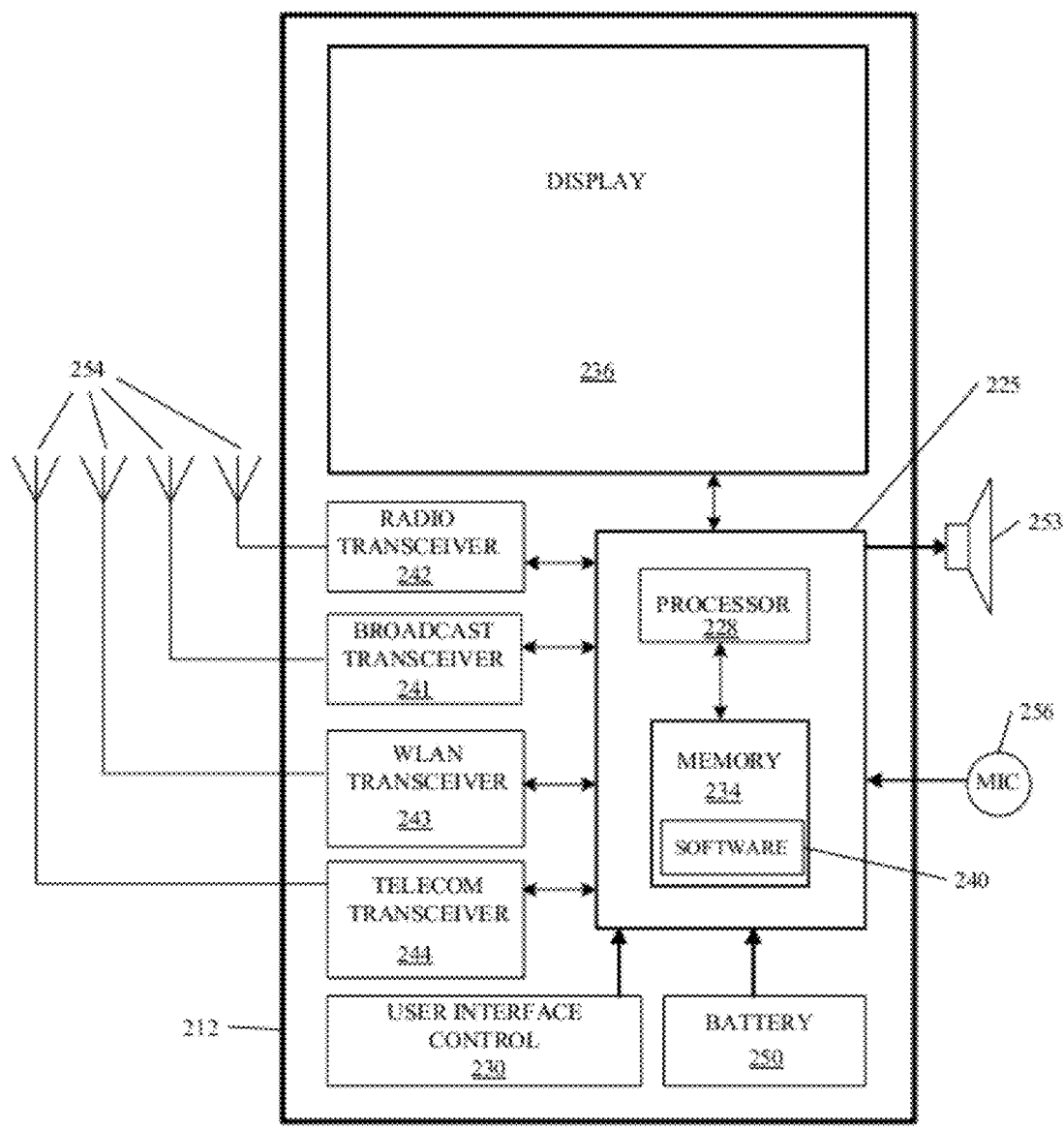
FIG. 2 is a block diagram of an example communication device according to one or more embodiments described herein.

FIG. 2 illustrates an example computing device 212 that may be used in a communication network such as those illustrated in FIGS. 1A-1C, to implement any or all of devices 105, 110, 115, 120, and/or 112. Device 212 may include a controller 225 connected to a user interface control 230, display 236 and other elements as illustrated. Controller 225 may include one or more processors 228 and memory 234 storing software 240, for example, client software 165 and/or user interface software. Device 212 may also include a battery 250, speaker 253, and one or more antennae 254. Device 212 may include user interface circuitry, such as user interface control 230. User interface control 230 may include controllers or adapters, and other circuitry, configured to receive input from or provide output to a keypad, touch screen, voice interface—for example via microphone 256, function keys, joystick, data glove, mouse and the like. The user interface circuitry and user interface software may be configured to facilitate user control of at least some functions of device 212 though use of a display 236. Display 236 may be configured to display at least a portion of a user interface of device 212. Additionally, the display may be configured to facilitate user control of at least some functions of the device (e.g., display 236 could be a touch screen).

Computer executable instructions and data used by processor 228 and other components of device 212 may be stored in a storage facility such as memory 234 and/or in hardware logic in an integrated circuit, ASIC, etc. Memory 234 may include any of various types of tangible machine-readable storage medium, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. As used herein (including the claims), a tangible machine-readable storage medium is a physical structure that can be touched by a human. A signal would not by itself constitute a tangible machine-readable storage medium, although other embodiments may include signals or other ephemeral versions of instructions executable by one or more processors to carry out one or more of the operations described herein.

Software 240 may be stored within memory 234 to provide instructions to processor 228 such that when the instructions are executed, processor 228, device 212 and/or other components of device 212 are caused to perform various functions or methods such as those described herein. Software may include both applications and operating system software, and may include code segments, instructions, applets, pre-compiled code, compiled code, computer programs, program modules, engines, program logic, and combinations thereof.

Device 212 or its various components may be mobile and be configured to receive, decode and process various types of transmissions including digital broadband broadcast transmissions that are based, for example, on a Digital Video Broadcast (DVB) standard, such as DVB-NGH, DVB-H, DVB-T2, DVB-H+ (hybrid satellite/terrestrial architecture), or Digital Video Broadcasting-Multimedia Home Platform (DVB-MHP), through a specific broadcast transceiver 241. Other digital transmission formats may alternatively be used to deliver content and information regarding availability of supplemental services. Additionally or alternatively, device 212 may be configured to receive, decode and process transmissions through various transceivers, such as FM/AM Radio transceiver 242, wireless local area network (WLAN) transceiver 243, and telecommunications transceiver 244.

Although the above description of FIG. 2 generally relates to a mobile device, other devices or systems may include the same or similar components and perform the same or similar functions and methods. For example, a computer communicating over a wired network connections (e.g., PC 115 of FIG. 1A) may include the components or a subset of the components described above, and may be configured to perform the same or similar functions as device 212 and its components.

Some digital video broadcasting protocols provide signaling information to allow for the discovery and reception of services and other data at an electronic device (e.g., device 212 of FIG. 2). A service may include several components that together form the service. Components can be also shared between two or more different services. A typical example of a service that includes several components is a teletext service or other non-real time service, which uses the same components for all channels from the same service provider.

Audio/Video (AV) content is another example of component transmission. For scalable video coding, a service may include an audio component, a base layer video component, and an enhancement layer video component. The base layer video component may have lower resolution than the enhancement layer video component. The AV components of each service might not be shared with other services, and may be sufficiently synchronous with each other to avoid synchronization problems at a receiver.

Figure 3A:
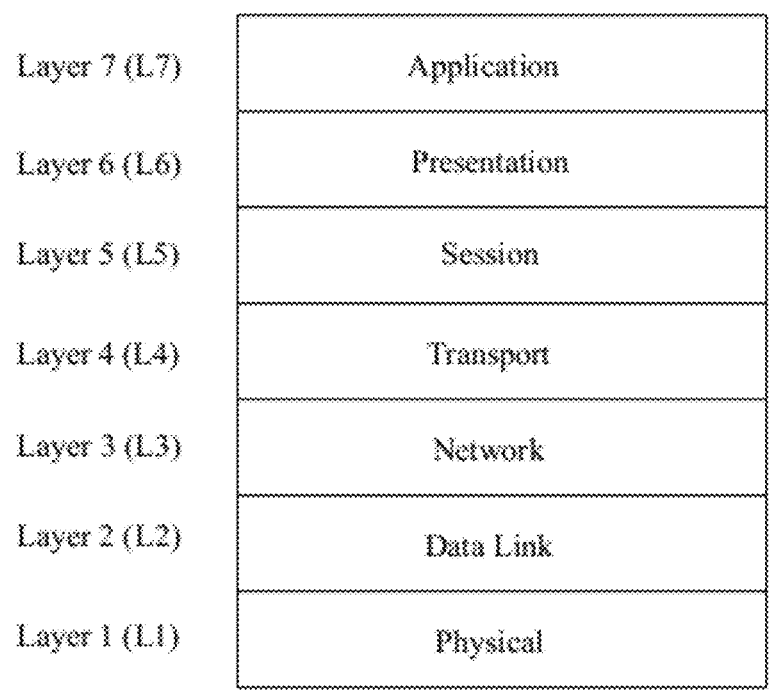
FIG. 3A illustrates an example data model for network transmissions according to one or more embodiments described herein.

According to some digital video broadcasting protocols, components that make up a particular service like a content program or an interactive function are mapped across a number of protocol layers. The Open Systems Interconnection (OSI) Reference Model, for example, provides for a layered communication architecture including a physical layer (L1). FIG. 3A illustrates one representation of an OSI Reference Model.

Figure 3B:
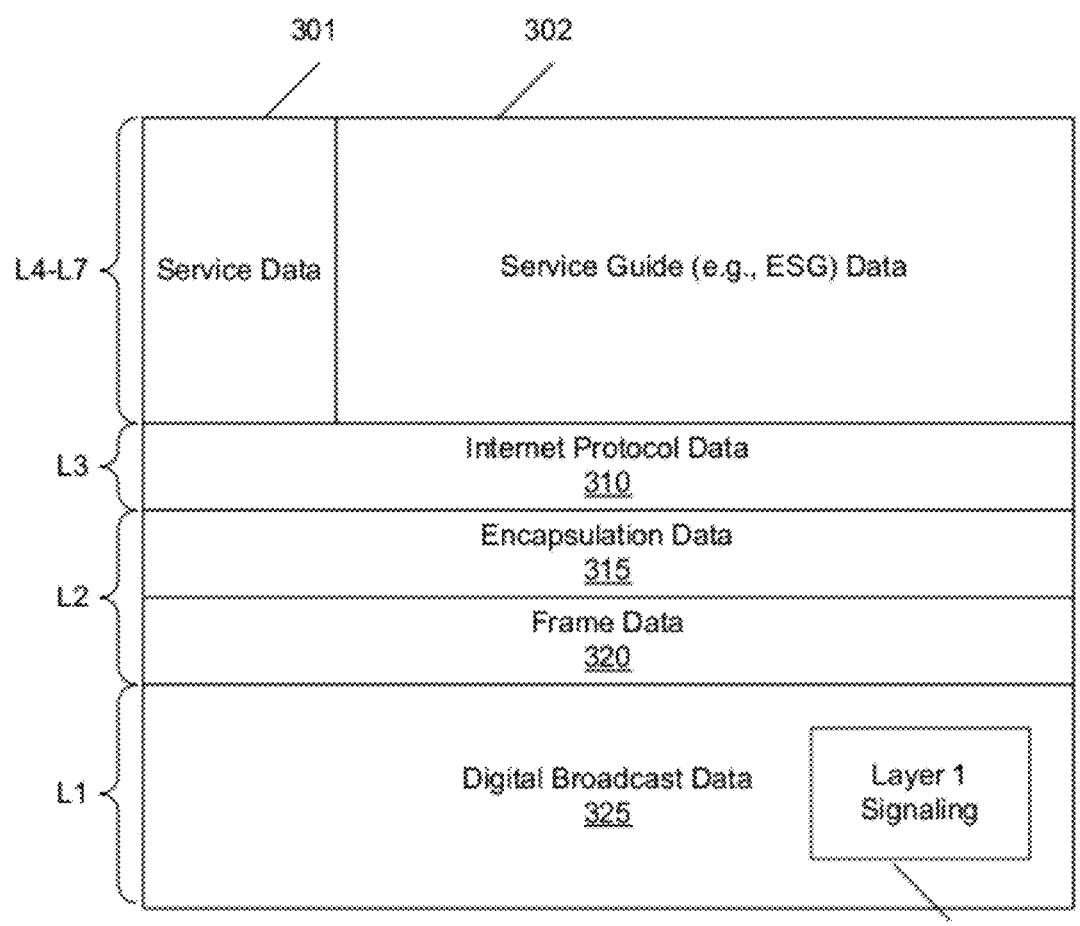
FIG. 3B illustrate an example protocol stack for a digital broadcast system according to one or more embodiments described herein.

FIG. 3B illustrates an example protocol stack of FIG. 3A applied to the signaling structure of a digital broadcast system. The example illustrated in FIG. 3B may be used as a protocol structure for a DVB-NGH system delivering a service guide (SG) along with other content and services. DVB-NGH includes Internet Protocol (IP) based and Transport Stream (TS) based profiles that may be used to deliver content and other services. DVB-NGH can be used in conjunction with other DVB broadcast systems, such as DVB-T2, DVB-T, DVB-H, etc. DVB-NGH may support broadcast delivery of services across different networks, and such support may include allowing for continuity of service.

At the lowest level, the physical layer (e.g., L1), as used herein, generally refers to a portion of a network protocol that is configured to define hardware-specific operations for effecting the transmission or reception of electronic signals over a data network. The physical layer is configured to facilitate the transmission of raw bits from a source to a destination. The physical layer may be configured to specify frequencies, voltages, bit rates and the like for transmission of data. The physical layer may include a number of physical layer pipes (PLPs).

A PLP generally refers to a transmission channel between a source and a destination node defined at the physical layer. The physical layer may define multiple channels—pipes—through which raw bits representative of the data such as broadcast data may be sent. For example, different broadcast services, service components, and data associated therewith may be mapped to different physical layer pipes through which the data is transmitted. Accordingly, the physical layer may be configured to identify the appropriate transmission channel for a series of bits corresponding to a particular service and transmit the data through the identified channel or pipe. In a broadcast arrangement, a PLP may be established between a source and multiple destinations. In one example, a PLP may correspond to a physical layer multiplexed channel (i.e., a multiplex) that is carried by specified slices of a transmission stream (e.g., a DVB-T2 stream, which uses time-division multiplexing). A PLP may also correspond to a physical layer multiplexed channel within a plurality of frequencies, for example as in the time-frequency slicing mode of DVB-T2 or DVB-NGH. When an end-user device wishes to access a component of a particular service, the end-user device may identify the corresponding PLP or PLPs from which to access the service data. In the broadcast scenario, a receiving device may listen for the particular PLP or PLPs carrying the desired service or services. Example embodiments permit transmission of multiple service components within the same PLP or different PLPs, as well as with different robustness levels for each PLP containing the components.

Above the physical layer, PLPs corresponding to components of a single service may be identified by combining PLPs into a logical grouping—into a link layer pipe—that is associated with a service. LLPs generally refer to logical associations such as mappings that link to a service or service components to a PLP. The logical associations may also include indications of the type of the PLPs associated with the services or the service components. These association types may for example refer to the content transmitted in a particular PLP, or the location of the PLP with respect to other PLPs. For example, an association type could indicate that a particular PLP is an anchor PLP. Such anchor PLPs may carry the most important data related to a particular service. Link layer pipes, which may also be referred to as logical layer pipes, bundle one or more physical layer pipes into one logical entity. LLPs may be defined using various data structures such as tables, lists and the like.

An LLP may comprise multiple frames, which may be used to allow for the division of resources in a broadcast transmission stream. Accordingly, a first frame of an LLP may be transmitted at time TIME1, while a second frame may be transmitted at time TIME2 and a third frame may be transmitted at time TIME3. The interval between the transmission of each frame in an LLP may be defined by a parameter (e.g., TINT LLPF). The parameter may define the amount of time between two consecutive frames of a particular LLP. During the time between frames of an LLP, frames of other LLPs may be transmitted. Accordingly, transmission bandwidth and resources may be divided amongst multiple LLPs.

LLP frames may vary in size from frame to frame. LLP frame size may be defined as BSLLPF (buffer size of LLP frame). This frame size may be, for example, the size of the largest LLP frame within an LLP. A receiver may determine whether it has buffering capacity to receive an entire LLP based on the BSLLPF and a time between two consecutive frames of a LLP, indicated for example by TINT LLPF as described above. Additionally or alternatively, BSLLPF may be required to be less than or equal to a specified size of the received buffer (BR) for reception of a LLP.

Grouped PLPs for a particular LLP may be defined by specified slots or slices and packet sizes in a transmission stream. For example, a first PLP for an LLP might be defined as occupying the first, fifth, and ninth slices in a payload portion of a DVB-T2 frame. PLPs may occupy different numbers of available slots or slices; for example, a PLP may be twice as large as another PLP and, therefore may occupy twice the number of available slots. A remainder of a DVB-T2 frame may be apportioned to header data and other LLP frames of other services.

The data depicted in FIG. 3B may be transmitted in one or more dedicated and/or dynamically allocated LLPs and may be transmitted in one or more dedicated and/or dynamically allocated PLPs, used by the system.

Above the physical layer, upper level data (e.g., service data 301 and SG 302) may be carried within one or more Internet Protocol (IP) streams at the IP stack layer 310, which is encapsulated into sections as encapsulation data 315, which may be encoded into transport streams as frame data 320. Data 315 and 320 together may form an MPEG-2 transport stream, or alternatively, may form Generic Stream Encapsulation (GSE) frames, or some other encapsulation frames.

As previously discussed, the service guide 302 describes for users the services and content available for subscription or purchase. Once a device selects a service or content from the service guide, additional signaling information is needed to map the components of the selected service from the upper layers down to the physical layer for extraction. For example, the physical layer may include layer 1 signaling information 309, which enables a receiving device to identify and extract the PLPs from the physical layer. Layer 2 and upper layer signaling information may also be required to link the services from the IP layer down to the PLPs. For example, various Digital Video Broadcast protocols may include upper level signaling data in the upper level layers, which map various services to service components, and service components to particular IP streams. Program Specific Information (PSI) or Service Information (SI) may also be included within the layer 2 data stream, which provides the mapping from the IP stack layer to the physical layer.

To acquire a particular service, a receiving device (e.g., remote wireless terminal, cell phone, etc.) must identify the required IP data streams for the desired service components. Once the IP streams are identified, the receiving device must go through a process of searching PSI and SI signaling data in every layer 2 data stream being received until sufficient information can be obtained to completely map the desired IP streams down to the physical layer. Searching the PSI or SI signaling information in this way may be inefficient in some wireless communications systems, such as Digital Video Broadcasting-Handheld (DVB-H) systems. Use of PSI or SI signaling in such systems requires a large amount of bandwidth, which is costly, decreases efficiency of the system, and may result in a sub-optimal end user experience. To alleviate this issue, various embodiments may include the layer 2 and upper layer signaling information in the service guide at the top layer.

For example, signaling information located in the SG may provide mapping information for various services to link layer pipes (LLPs) and physical layer pipes (PLPs) used in the broadcast system network when transmitting data from a source (e.g., service provider 125, content provider 130 of FIG. 1A, digital content sources 104 of FIG. 1B) to a destination (e.g., device 110 of FIG. 1A).

Figure 4A:
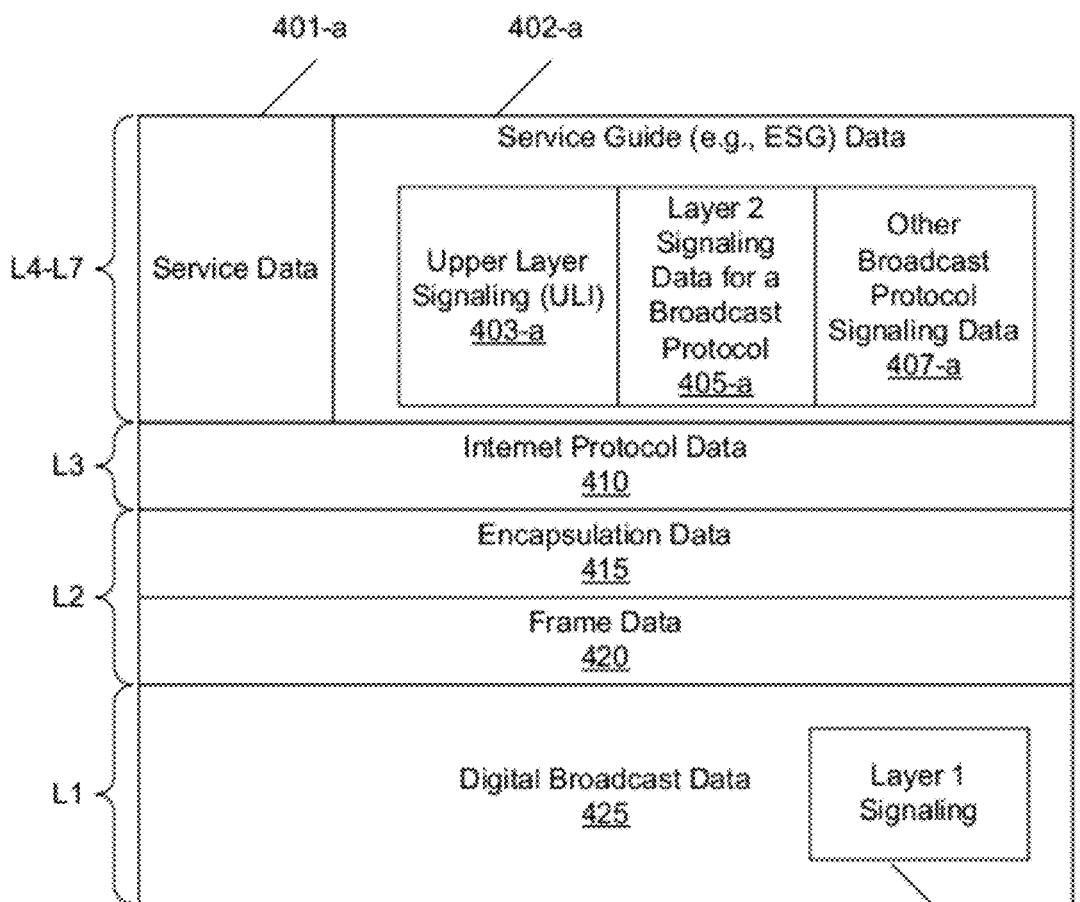
FIGS. 4A-4G illustrate example protocol stacks of the signaling structures for a digital broadcast system according to one or more embodiments described herein.

FIG. 4A illustrates an example protocol stack of FIG. 3B, with this additional signaling information carried within the service guide (SG) data 402-a, which identifies one or more services or content communicated as service data 401-a, which are available to client devices. In addition to identifying available services, the SG data 402-a, may also include all or portions of the signaling data above the layer 2 protocol. This signaling data may include upper layer signaling (ULI) 403-a, layer 2 (L2) signaling data for a broadcast protocol (e.g., DVB-NGH) 405-a, and other broadcast protocol signaling data 407-a. For example, the signaling data carried in the protocol stack of FIG. 4A can include signaling data specific to a particular system (e.g., DVB-NGH signaling in L2 signaling data 405-a) and signaling of other systems (e.g., DVB-H signaling, DVB-T signaling, DVB-T2 signaling, etc., in other broadcast protocol signaling data 407-a). In some embodiments, the service data 401-a and SG data 402-a (including 403-a, 405-a, and 407-a) may be carried on top of OSI layer 3 information.

In various embodiments, the signaling data for other systems included in other broadcast protocol signaling data 407-a may be provided outside of SG data 402-a, and may be allocated in dedicated and/or dynamically allocated IP addresses and ports. Additionally, the signaling data for the other systems can be transmitted in dedicated and/or dynamically allocated PLPs within a frame, such as a DVB-NGH frame.

Figure 4B:
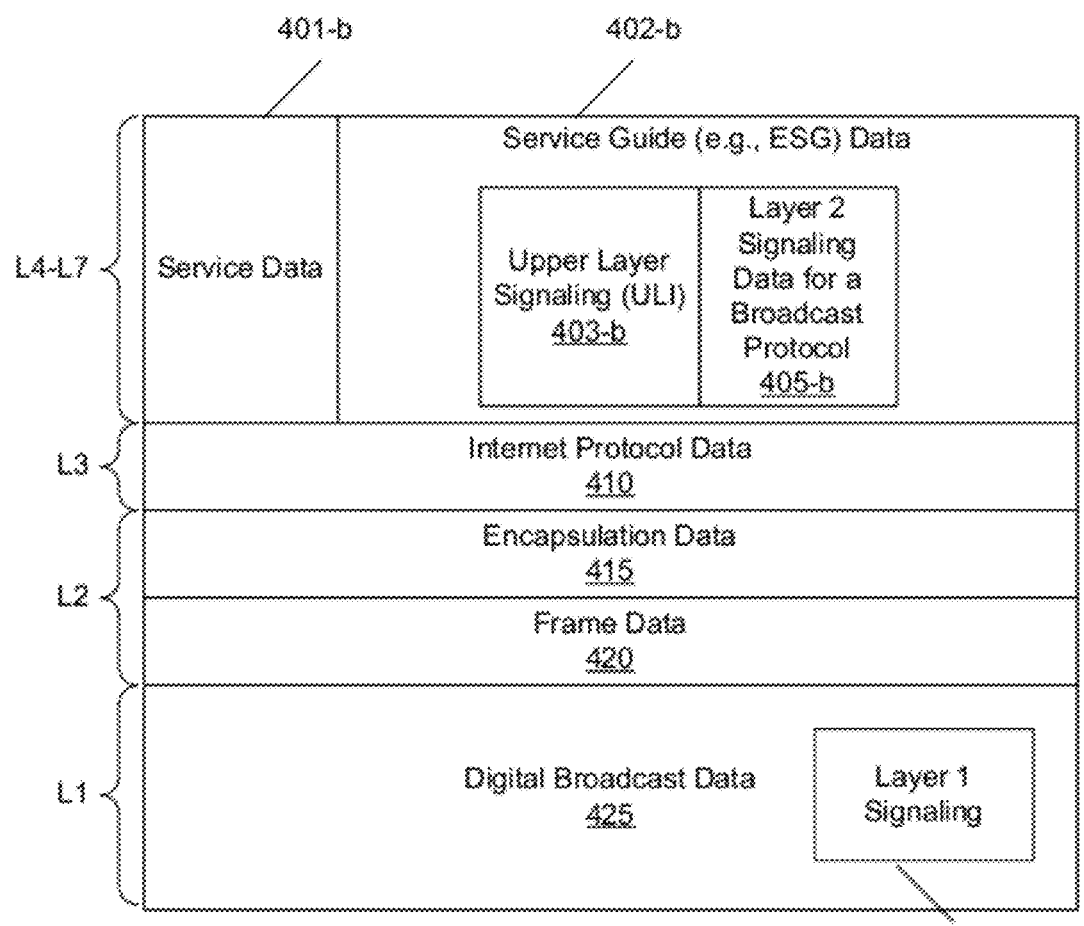

FIG. 4B illustrates a protocol stack for a dedicated system (e.g., a system dedicated to DVB-NGH), which includes service data 401-b and SG data 402-b. Like SG data 402-a, SG data 402-b identifies one or more services or content communicated as service data 401-b, which are available to client devices. In addition to identifying available services, the SG data 402-b, may also include all or portions of the signaling data above the layer 2 protocol. The signaling data may include upper layer signaling (ULI) 403-b, and L2 signaling data for the broadcast protocol (e.g., DVB-NGH) 405-b. In some embodiments, the service data 401-b and SG data 402-b (including 403-b and 405-b) may be carried on top of OSI layer 3 information.

One example of SG data 402-a and 402-b transmitted on top of layer 3 Internet Protocol 410 is described in the Open Mobile Alliance (OMA)—Service Guide for Mobile Broadcast Services specification, OMA-TS-BCAST_Service_Guide-V1_1, dated Sep. 14, 2010 (hereinafter OMA BCAST ESG). The OMA BCAST ESG standard is incorporated herein by reference in its entirety.

The Electronic Service Guide (SG) may be used to provide program or service related information. Generally, an Electronic Service Guide (SG) enables a terminal to communicate what services are available to end users and how the services may be accessed. The SG may include independently existing pieces of SG fragments. In various examples, SG fragments include XML and/or binary documents, and may encompass a vast array of items, such as for example, a SDP (Session Description Protocol) description of media files, textual files, and/or an image. In some variations, SG fragments may each be separate well-formed XML documents that are uniquely identifiable, and the entire SG may be defined as a set of these fragments. Because each fragment is a complete XML document, which is unique, the fragments may be individually replaced and updated as programming content and services change.

The SG fragments describe one or several aspects of currently available (or future) services, content, or broadcast programs. Such aspects may include for example: free text description, schedule, geographical availability, price, purchase method, genre, and supplementary information such as preview images or clips.

The SG fragments may be organized and formatted into different types. For example, one type of fragment referred to as a service fragment may describe a broadcast service and include metadata that identifies content items associated with the service, availability of the service, and an overall description of the service. This service fragment may point to other fragments, which provide further details of the service. The other fragments may provide detailed descriptions of content items within a service, define timeframes of the content items are streamed/downloaded and rendered, describe capabilities and options for a terminal to access content and services, describe groups of services which may be provided together, describe purchase and pricing information for groups of services, describe subscription channels on which purchased services may be obtained, provide preview information, and provide information about interactivity of services.

Certain SG fragments may also provide session description information for each service, which includes information for session initiation of a service, such as a multimedia service. Theses session description fragments may include session description information that conveys session announcements, and other description information used for delivery procedures to initiate a session of a service. The session description information in the SG for a service may be formatted according to the Session Description Protocol (SDP) defined in the Request for Comment standard, RFC4566, published by the Internet Engineering Task Force (IETF), or according to 3GPP the MBMS User Service Bundle Description standard 3GPP TS 26.346.

For each service, certain SG fragments may provide access information that describes how a client device may access the service. These access fragments may include information on the delivery method of the service, the required capabilities of the client device to use the service, and provide alternative ways to access or interact with the service. The access fragments may include reference to the session description fragments described above, or include the session description information directly in SDP format or another format.

In various embodiments, the fragments may also include metadata related specifically to mobile broadcasting. The metadata may identify availability of a service within a broadcast region such as identifying which cells in FIG. 1C a particular service may be broadcast.

Each service included in the SG information may have a Global service identifier, which may be a unique identifier of the service. Each service may be associated with one or more components that may respectively transport audio, video, text, etc. Each component may be associated with a uniform resource identifier (URI) to identify information corresponding to the components of the desired service from service association information. In one example, using SG information, service association information, and local multiplex information, a receiving device may identify a particular PLP carrying a component of a desired service as previously described. SG information may be received via any type of bearer (for example, application, point-to-point, broadcast, etc.).

The services may include audio, video and other types of data, and may include Open Mobile Alliance Mobile Broadcast (OMA BCAST) services. The service data and the SG data may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data may be transmitted through the Internet addressed to a single user. Data may also be addressed to a group of users, commonly known as multicasting.

In various aspects, the SG fragments may be grouped and encapsulated together into service guide delivery units (SGDUs) for delivery as transport objects in the transport layer. The SGDUs may be protocol independent. In various examples, the transport layer may be based on a User Datagram Protocol (UDP) layer, which may be carried on top of the Internet Protocol Data layer 410 in FIGS. 2A and 2B. One such UDP based transport layer protocol may include a combination of File Delivery over Unidirectional Transport (FLUTE) and Asynchronous Layered Coding/Layered Coding Transport (ALC/LCT). FLUTE, ALC, and LCT may be as defined in the Request for Comment standards, RFC3926, RFC3450, RFC 3451, respectively, published by the Internet Engineering Task Force (IETF).

The SGDUs may further be delivered as transport objects, which have previously been compressed. For example, in one embodiment GNU ZIP (GZIP) compression may be used to compress each of the SGDUs into a GZIP file, which may be broadcast using the ALC/FLUTE transport protocol.

Each SG fragment may have a unique fragment identifier (e.g., a fragment ID) that allows a client device to distinguish one fragment from another. The unique identifier may be a Uniform Resource Identifier (URI). The fragment identifier may be different for fragments in different formats. If the fragment is an XML document, the fragment identifier may be the top level "id" attribute. For other fragment formats, a separate fragment ID may be assigned. Each SG fragment may also be assigned a transport identifier for addressing the fragments at the transport layer (i.e., within a SGDU). The transport identifier may be independent of the type of format of the SG fragment. The transport identifier (e.g., fragmentTransportID), may be uniquely assigned to a SG fragment for the life of the fragment. When the fragment expires, the transport identifier may be updated for a newer version of the same fragment. By monitoring changes in the 'fragmentTransportID' (and another field, 'fragmentVersion'), a terminal can quickly infer whether the associated fragment in the SGDU has changed.

The SG fragments may be organized within SGDUs differently for different applications. As previously discussed, SG fragments may be delivered via a broadcast, multicast, or to a single user. When delivered to a single user/client device, the delivery may be in response to specific interactive request from the client device. If delivered in response to a client device request, the request may define how the fragments are organized in the SGDU. For example, a client device may have requested an update for a specific portion of the SG, and thus the SGDU would contain only updated fragments, related to the requested SG portion. In the case of a broadcast, the organization of SG fragments in SGDUs may be fixed and organized to a set of rules. For example, each SGDU may contain SG fragments that are likely to be updated together, such that when one or more of the fragments in and SGDU is polled in the broadcast and detected as being expired, the entire SGDU may be received and updated.

In addition to the SG fragments, various embodiments include delivery description data that enables a client device to discover the SG and services, and describes how the fragments are accessible in the SGDUs within the transport stream. OMA BCAST ESG provides one example of delivery description data referred to as a service guide delivery descriptor (SGDD). The format of the delivery description data may be according to a predefined or standardized XML schema or may be according to some other format.

The delivery description data, (e.g., SGDD) may include mapping information that identifies every fragment of a SG, indicates the location of each SGDU within a transport protocol, and indicates where each fragment may be found in the SGDUs or other data structures within a transport stream. The delivery description data may include fragment description data such as binding information between the fragment identifier and transport identifier of every fragment, as well as timing data for each fragment to indicate when the fragment is valid or when it is to be displayed, etc. The delivery description data may further provide network and service provider identification information and roaming rules for accessing different services, or portions thereof, across different portions of a network or across different networks. Such data may identify the type of underlying broadcast service on which the SG and services are provided (e.g., IPDC over DVB-H, DVB-SH, WiMax, DVB-NGH, etc.). The delivery description data may further describe one or more entry points at which the SG may be accessed, as further discussed below.

The delivery of the delivery description data may be similar to the SGDU, and may be delivered as transport objects within a transport protocol such as UDP, FLUTE, and/or ALC/LCT. The delivery description data may further be compressed to reduce bandwidth requirements for delivering the data. For example, in one embodiment GNU ZIP (GZIP) compression may be used to compress each SGDD into a GZIP file, which may be, for example, broadcast using the ALC/FLUTE transport protocol.

As previously indicated, in addition to providing service information, the SG may also contain the signaling information as shown in FIGS. 4A and 4B. FIGS. 4C-4G illustrate various embodiments of embedding signaling information within SG constructs.

Figure 4C:
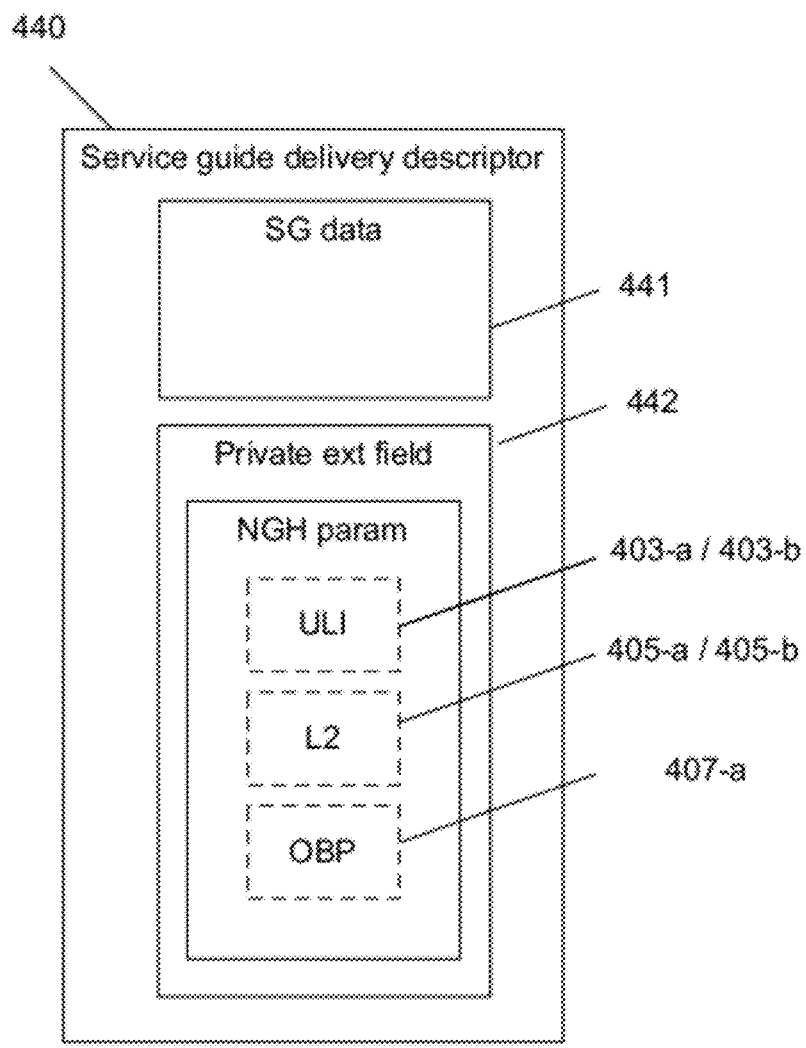

FIG. 4C illustrates one embodiment of delivery description data 440, which may be for example a SGDD as defined in OMA BCAST ESG. SGDD 440 may be an XML document, binary data, or other formatted data that includes the SG data 441 described above for identifying and locating SG fragments and other SG related information. SGDD 440 data may also include a private extension field 442 within the delivery description data. Private extension field 442 may be included as a container for proprietary or application-specific extensions. Within 442, the signaling parameters, such as NGH parameters ULI 403-*a* and 403-*b*, L2 signaling parameters 405-*a* and 405-*b*, and other protocol signaling 407-*a*, may be included.

Figure 4D:
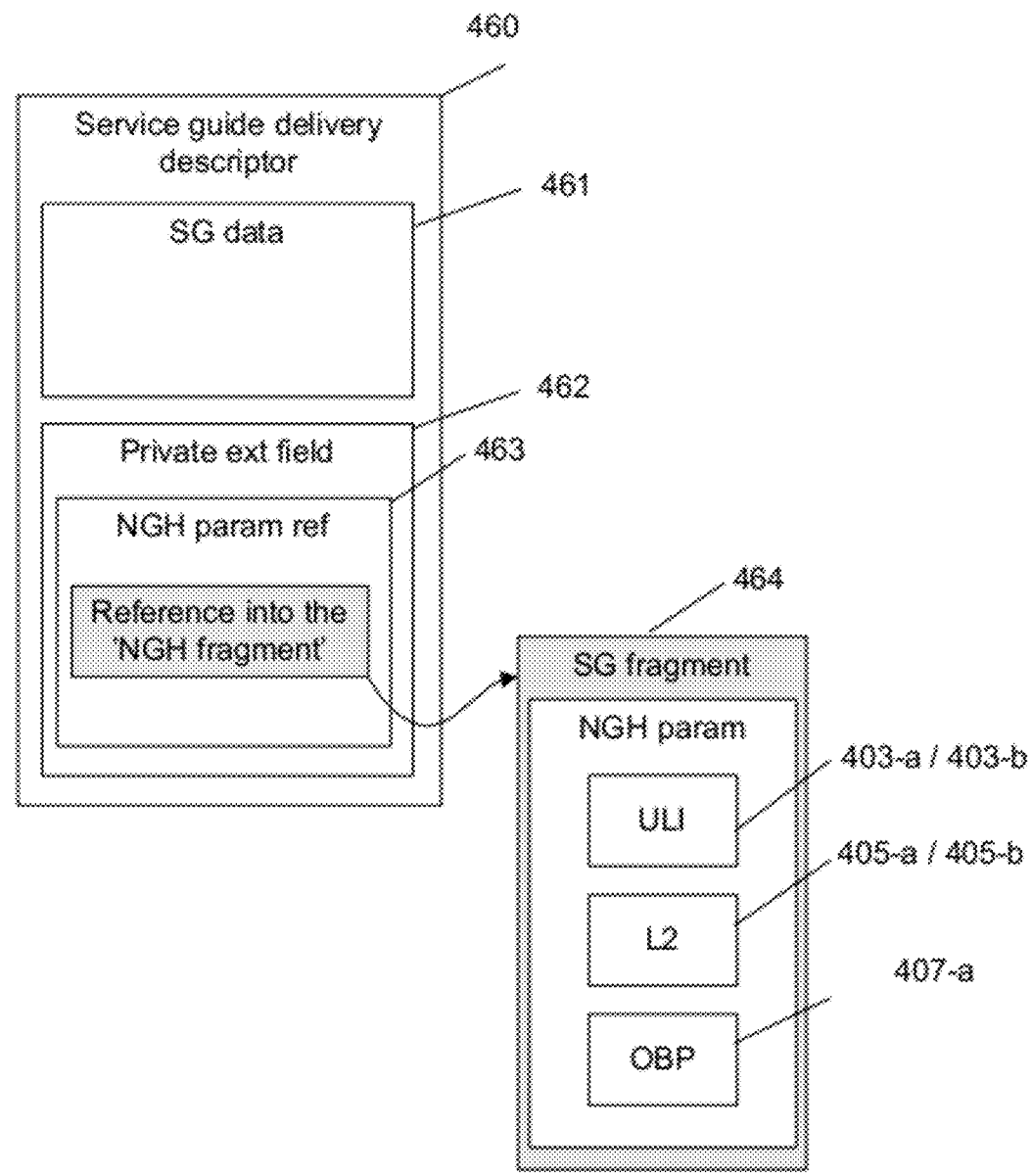

In an alternate embodiment, the SG may include the signaling parameter in a SG fragment as illustrated in FIG. 4D. The delivery description data 460, the SG data 461 and the private extension field 462 may be similar to 440, 441, and 442, respectively, in FIG. 4C. However, in this embodiment the private extension field includes one or more references 463 to SG fragments 464, which include the signaling data (e.g., NGH parameters ULI 403-*a* and 403-*b*, L2 signaling parameters 405-*a* and 405-*b*, and other protocol signaling 407-*a*). The signaling data may be contained in one fragment, or may be partitioned into several fragments as identified by the references 463. In one variation, the references 463 are of the same format provided in the SG data 461, and the fragments containing the signaling data may be formatted in the same manner as the other SG fragments contained within SGDUs. The SG fragments including the signaling data may include a unique identifier (e.g., URI="NGH_service1") by which the fragment may be identified and referenced. In another variation, the fragments containing the signaling data may be of a different customized format tailored to the signaling data.

Figure 4E:
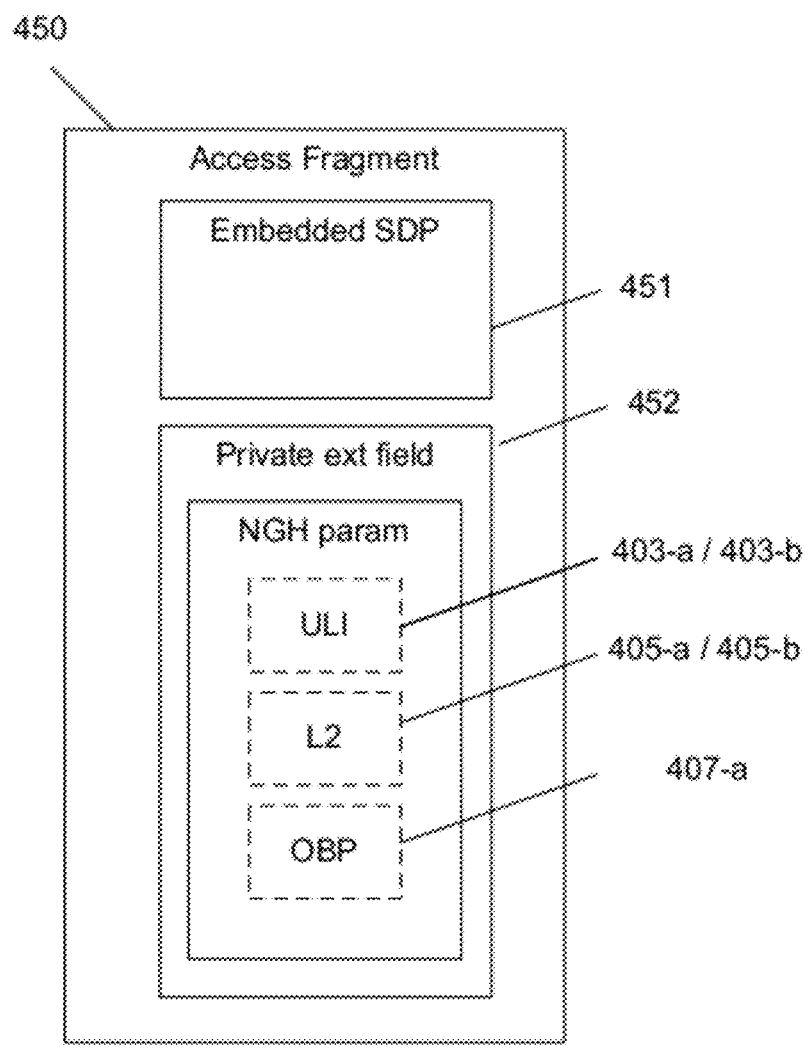

FIG. 4E illustrates another embodiment of signaling data (e.g., DVB-NGH signaling data) embedded within a private extension field 452 of an access fragment 450. The signaling data may be the same as in previous examples data (e.g., NGH parameters ULI 403-*a* and 403-*b*, L2 signaling parameters 405-*a* and 405-*b*, and other protocol signaling 407-*a*). As previously discussed, access fragments describe how a client device may access a service and may include embedded SDP data 451 describing session description information for session initiation of a service. As further described with respect to FIG. 6D below, the SDP data 451 may be referenced and used along with the NGH parameters for linking the service in the IP layer and upper layers down to the physical layer.

Figure 4F:
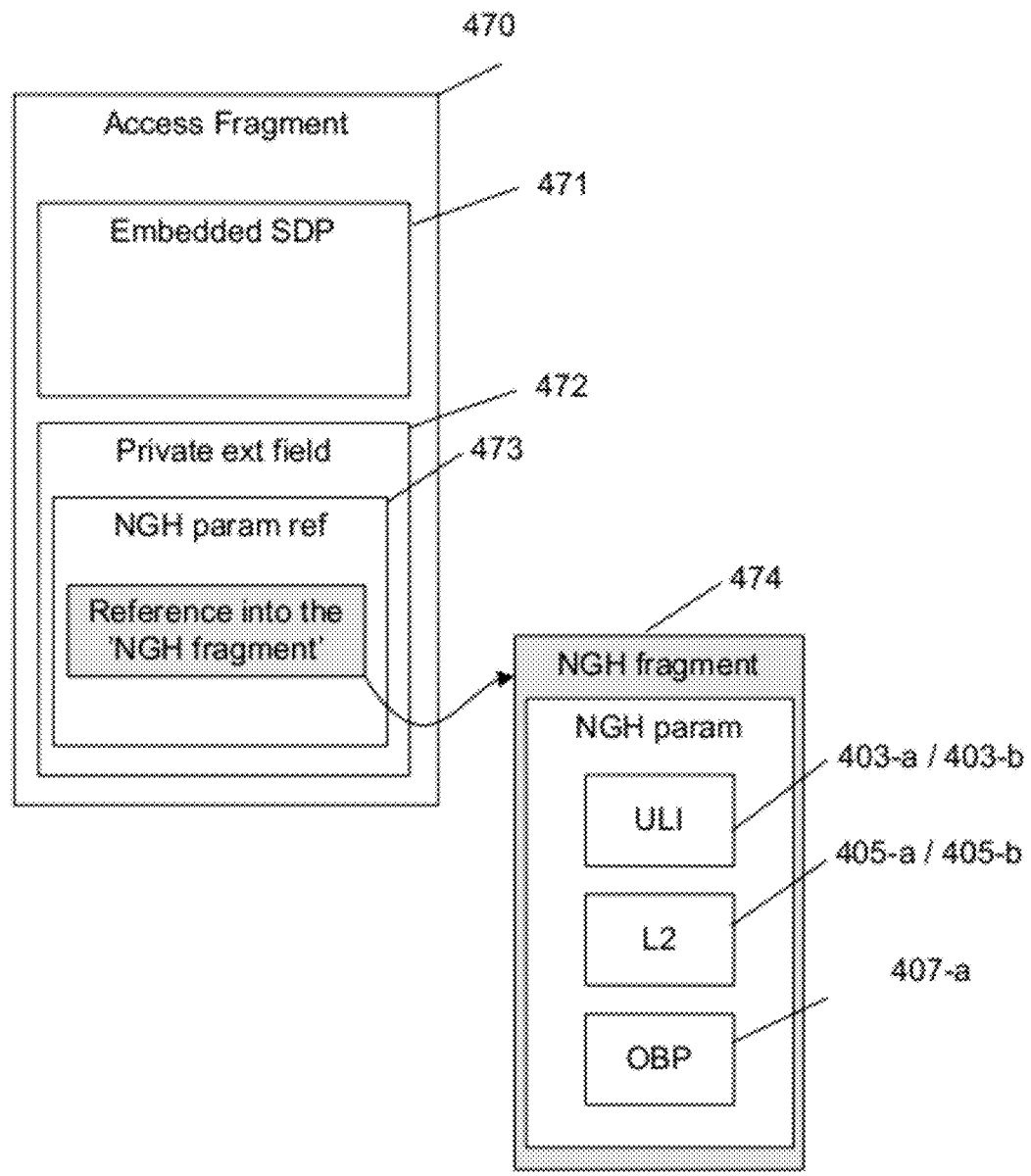

FIG. 4F illustrates another embodiment of an access fragment 470 having embedded SDP data 471. In this embodiment, the private extension field 472, includes references to one or more other fragments 474 that include the signaling data (e.g., NGH parameters ULI 403-*a* and 403-*b*, L2 signaling parameters 405-*a* and 405-*b*, and other protocol signaling 407-*a*). In one variation, the references 473 are of the same format provided in the SG data 441 and 461 of FIGS. 4C and 4D, and the fragments containing the signaling data may be formatted in the same manner as the other SG fragments contained within SGDUs. The SG fragments including the signaling data may include other SG data or may include only signaling data. The fragments containing only signaling data may include a unique identifier (e.g., URI="NGH_service1") by which the fragment may be identified and referenced. In another variation, the fragments containing only the signaling data may be of a different customized format tailored to the signaling data. As in FIG. 4E, the SDP data 471 in the access fragment may be referenced and used along with the NGH parameters in the signaling fragment 474 for linking the service in the IP layer and upper layers down to the physical layer.

Figure 4G:
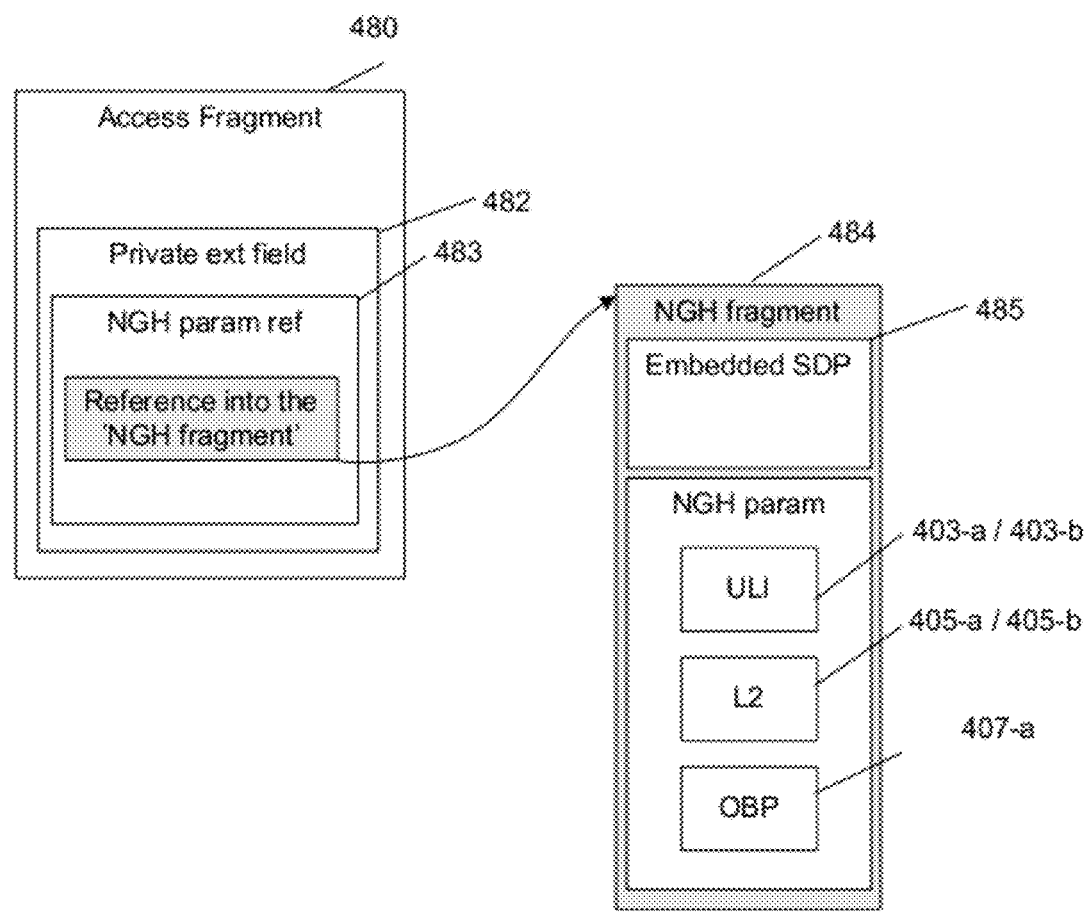

FIG. 4G illustrates an alternate embodiment similar to the embodiment of FIG. 4F, except that the signaling fragment 484 includes the embedded SDP 485 instead of the access fragment 480 (e.g., 471 in FIG. 4F). In one variation, both the access fragment 480 and the signaling fragment 484 include embedded SDP data. In certain variations, the embedded SDP data 485 includes session description data for only those services and components which are identified in the signaling data (e.g., NGH parameters ULI 403-*a* and 403-*b*, L2 signaling parameters 405-*a* and 405-*b*, and other protocol signaling 407-*a*).

Other embodiments may include different combinations of the data and fragments illustrated in FIGS. 4C-4G, and may include separate session description fragments including embedded SDP data, which may be referenced by the SGDDs, access fragments, and signaling fragments (e.g., NGH fragments).

Figure 5:
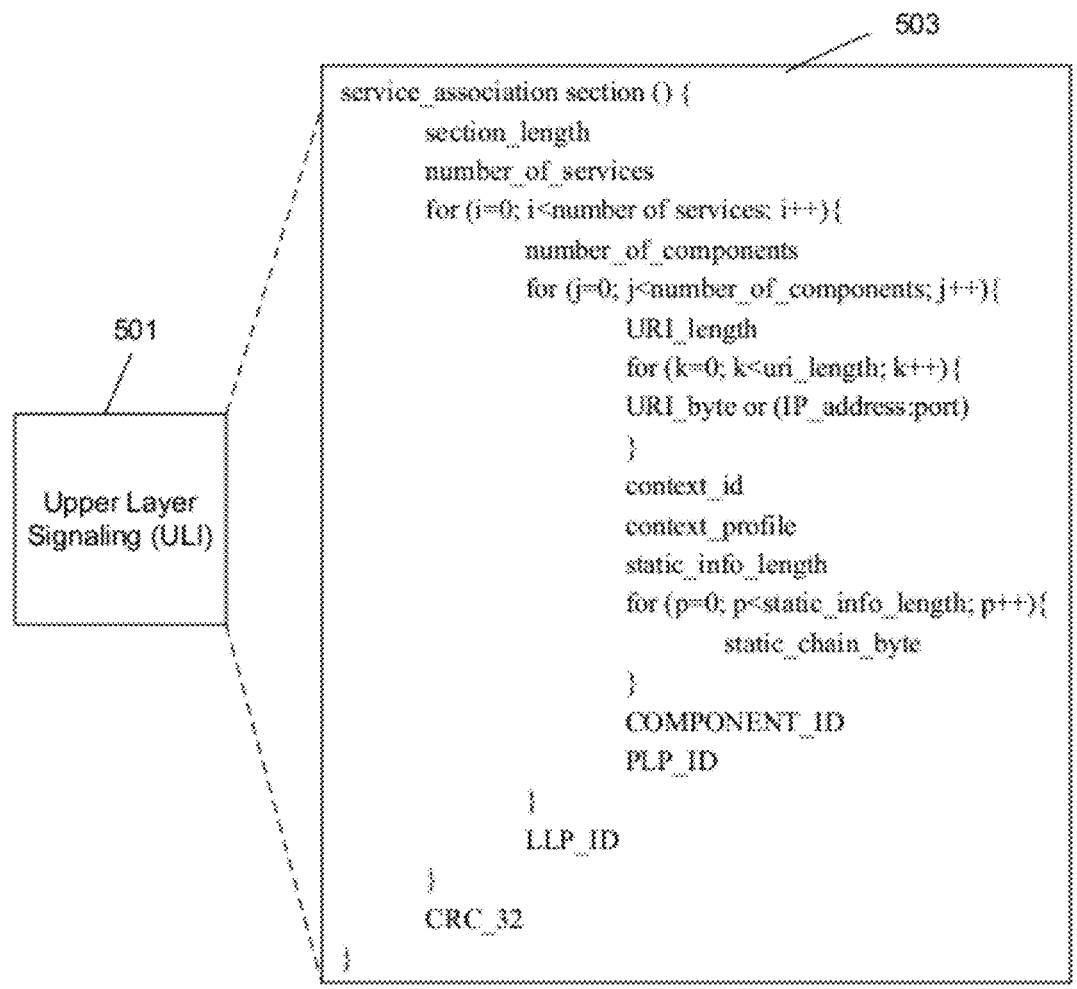
FIG. 5 depicts an example signaling structure for upper layer signaling in accordance with the examples shown in FIGS. 4A and 4B.

With respect to the upper layer information (ULI) of the illustrated example protocol stacks (e.g., ULI 403-*a* of FIG. 4A and ULI 403-*b* of FIG. 4B), the ULI can include information that maps services into the component identifiers for the services. Additionally, the upper layer information may include SG specific signaling information and/or other upper layer transmission protocol data, such as data of protocols defined in OMA BCAST ESG and/or DVB IPDC. Additionally, the ULI may include information that maps services into component identifiers for the services and provides Robust Header Compression (RoHC) information for each data stream. FIG. 5 depicts one example of a ULI signaling structure for service/component mapping in accordance with the example protocol stacks of FIGS. 4A and 4B. As illustrated in FIG. 5, upper layer information 501 (e.g., 403-*a*, 403-*b*) is represented by service association section 503. Some embodiments of service association section 503 incorporate a nested sequence of data elements. In FIG. 5, this nested sequence of data elements is for convenience represented by loop pseudocode. Other embodiments may incorporate a simplified structure in which the upper layer information 501 is represented by a section that is predefined (e.g., predefined length and section structure). In some embodiments, service association section 503 may be a table and/or a part of a table, and may include information related to the table, such as a table identifier, table section information (e.g., a section length parameter), a table version number, a table section number, a previous section number, other data flags (e.g., a flag indicating whether the currently applicable table is the current or next version of the table), etc.

Referring to the information included within the service association section 503, a section_length parameter may be a field (e.g., a 32 bit field) that indicates the length of the service association section and a number_of_services parameter may be a field (e.g., an 8 bit field) indicating the number of services delivered through the current channel (e.g., multiplex). In the representation of FIG. 5, number_of_services indicates the number of iterations for the loop that is located in the example service_association section 503 between number_of_services and CRC_32. In an actual ULI signaling structure, the number of services parameter could represent a number of consecutive data blocks, with each of those blocks including data of the types described a and corresponding to other parameters in FIG. 5 between "for (i=0; i<number of services; i++){" and "CRC_32".

Each service may include one or more components, and the number_of_components parameter may be a field (e.g., 8-bit field) used to indicate the number of components delivered through the corresponding service. In the representation of FIG. 5, number_of_components indicates the number of iterations for the loop that is located in the example service_association section 503 between number_of_components and LLP_ID. In an actual ULI signaling structure, the number_of_components parameter could represent a number of consecutive data blocks, with each of those blocks including data of the types described below and corresponding to other parameters in FIG. 5 between "for (j=0; j<number_of_components; j++){" and "LLP_ID".

For each component of each service, a resource length parameter (e.g., URI_length) may be a field (e.g., 8 bit field) used for indicating the length of the URI for that service/component. In the representation of FIG. 5, URI_length indicates the number of iterations of the loop that is located in the example service_association section 503 between URI_length and context_id, and that retrieves the URI_byte or (IP_address:port) parameter(s). In an actual ULI signaling structure, the URI_length parameter could represent a number of consecutive data blocks, with each of those blocks including data of the types described below and corresponding to other parameters in FIG. 5 between "for (k=0; k<uri_length; k++){" and "COMPONENT_ID".

The URI_byte or (IP_address:port) parameter(s) may be a string of one or more bytes (e.g., text bytes), which indicate the URI or number sequence (e.g., IPv4/IPv6 address and port number) for locating a service/component identified by the data block within the sequence of data blocks associated with a given "i" and "j" in the representation of FIG. 5.

In addition to the URI location identifier string, a number of other parameters are provided for each service/component to support RoHC decompression. These may include a context_id parameter indicating the context id of the RoHC compressed IP stream, the context_profile parameter indicating context profile of the compressed IP stream, the static_info_length parameter indicating the length of the static chain byte sequence, and the static_chain_byte parameter, which may be a byte sequence indicating the static information of the compressed IP stream.

For each component of each service, a PLP_ID parameter may be a field (e.g., 8 bit field) identifying uniquely the physical layer pipe through which the corresponding component is delivered. Similarly, for each service, a LLP_ID parameter may be a field (e.g., 16-bit field) identifying uniquely one logical layer pipe within the network for the corresponding service. Each component may further include a COMPONENT_ID field (e.g., 32 bit field), which may identify the component within a session, and may correlate to a session description of the service formatted in SDP within the SG (as further described with respect to FIG. 6*d*).

A cyclic redundancy check (CRC) parameter (e.g., CRC_32) may contain a CRC value for performing a redundancy check. In one example, CRC_32 may be a 32-bit field that contains the value that gives a zero output of the registers in the CRC decoder.

Figure 6A:
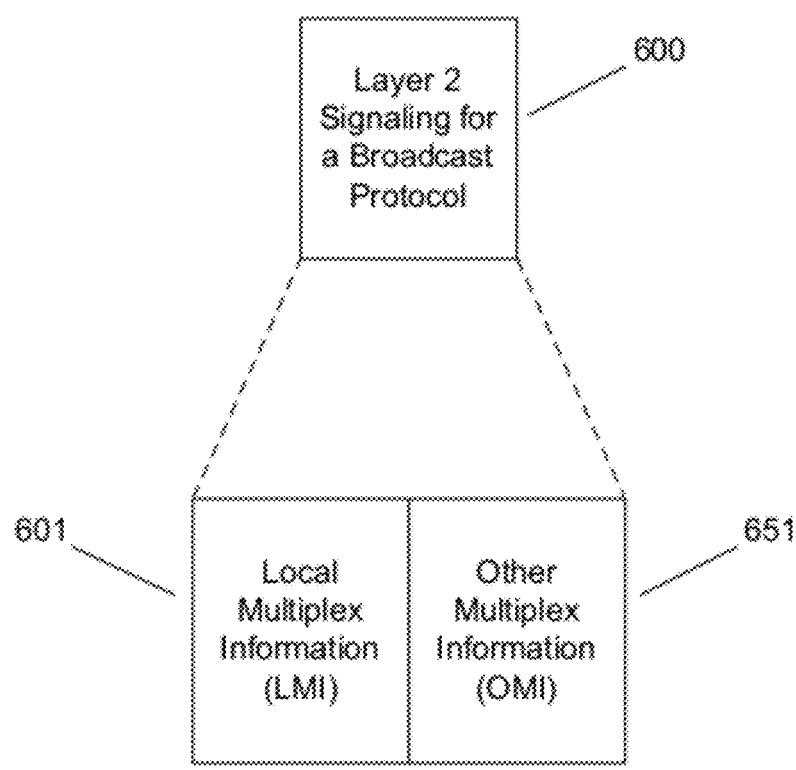
FIGS. 6A-6D depict example signaling structures for upper level and layer 2 signaling data in accordance with the examples shown in FIGS. 4A and 4B.

With respect to the L2 signaling data for a broadcast protocol of the illustrated example protocol stacks (e.g., DVB-NGH), the L2 signaling data can include data related to local multiplex information and other multiplex information. The L2 signaling data may include information that maps between services and multiplex information. In some embodiments, the included information may be similar to the information of PSI/SI signaling. Traditionally, PSI/SI signaling is carried with OSI Layer 2 information. In contrast to PSI/SI signaling, in some embodiments, the L2 signaling data may be carried within the SG in OSI layers 3 and above. FIG. 6A illustrates an example detailed view of L2 signaling data in accordance with the example protocol stacks of FIGS. 4A and 4B. As illustrated in FIG. 6A, the L2 signaling data 600 (e.g., L2 signaling data 405-*a* of FIG. 4A and L2 signaling data 405-*b* of FIG. 4B) may be divided into local multiplex information (LMI) 601 and other multiplex information (OMI) 651. LMI 601 may include information that maps the LLP identifiers (e.g., LLP_ID) to the PLP identifiers (e.g., PLP_ID) of the current multiplex (e.g., the multiplex being received in the currently received signal). In addition, the local multiplex information may provide information about the buffer model of the associated LLP. OMI 651 may include information that maps component identifiers, PLP identifiers and LLP identifiers with the multiplexes available within neighboring cells or other multiplexes.

Figure 6B:
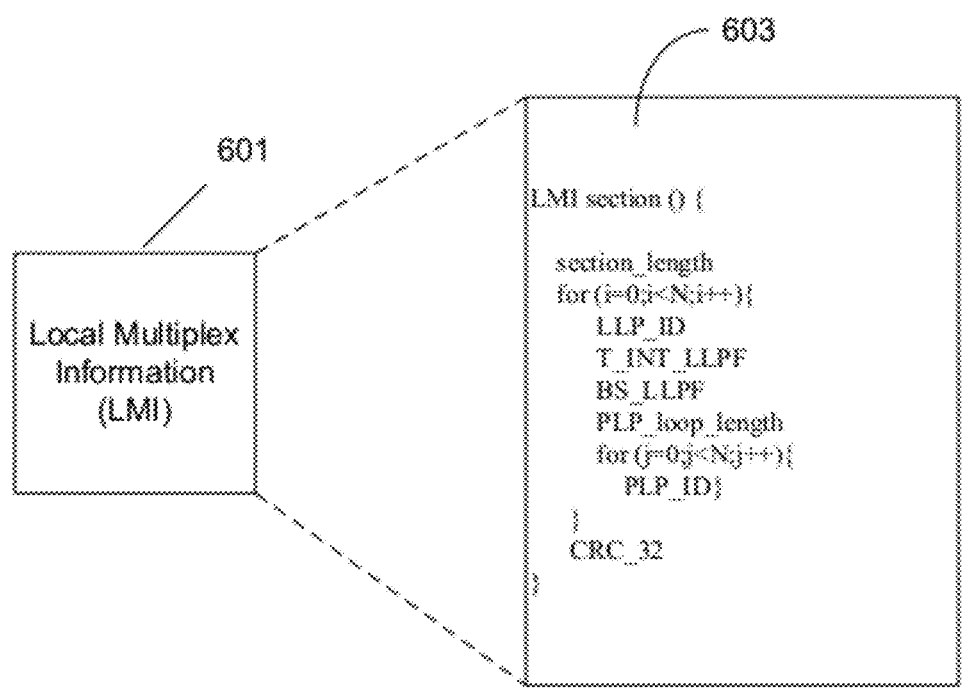

FIG. 6B illustrates an example signaling structure for local multiplex information in accordance with the example L2 signaling data of FIG. 6A. As illustrated in FIG. 6B, local multiplex information 601 is represented by LMI section 603. Some embodiments of LMI section 603, as shown in FIG. 6B, may incorporate a nested sequence of data elements that is represented in FIG. 6B by a loop pseudocode. Other embodiments may incorporate a simplified structure in which local multiplex information 601 is represented by a section that is pre-defined (e.g., predefined length and section structure).

Referring to the information included within the LMI section 603, a section length parameter (e.g., section length) may indicate a number of LLPs. In the representation of FIG. 6B, section_length indicates the number of iterations of the loop between section_length and CRC_32. In an actual LMI signaling structure, the section length parameter could represent a number of consecutive data blocks, with each of those blocks including data of the types described below and corresponding to other parameters in FIG. 6B between "for (i=0;i<N;i++){" and "CRC_32". In another example, section_length in the actual LMI signaling structure may indicate the entire length of the LMI signaling structure.

A LLP identifier parameter (e.g., LLP_ID) may be used to identify each LLP. In one example, each LLP has a corresponding LLP_ID.

A time interval parameter (e.g., T_INT_LLPF) may be used to indicate the time between LLP frames in a transmission (e.g., milliseconds, OFDM symbols).

A maximum size parameter (e.g., BS_LLPF) may be used to indicate the size of the largest frame within an LLP.

A PLP loop length parameter (e.g., PLP_loop_length) may be used for indicating the number of PLPs associated with the LLP. In the representation of FIG. 6B, PLP_loop_length indicates the number of iterations of the loop between PLP_loop_length and PLP ID. In an actual LMI signaling structure, the PLP_loop_length parameter could represent a number of consecutive data blocks, with each of those blocks including a PLP_ID parameter as described below.

A PLP identifier parameter (e.g., PLP_ID) may be used to identify each PLP grouped within the LLP identified by LLP_ID in a data block associated with a given "i" in the representation of FIG. 6B. In one example, each PLP has a corresponding PLP_ID.

A cyclic redundancy check (CRC) parameter (e.g., CRC_32) may contain a CRC value for performing a redundancy check. In one example, CRC_32 may be a 32-bit field that contains the value that gives a zero output of the registers in the CRC decoder.

Figure 6C:
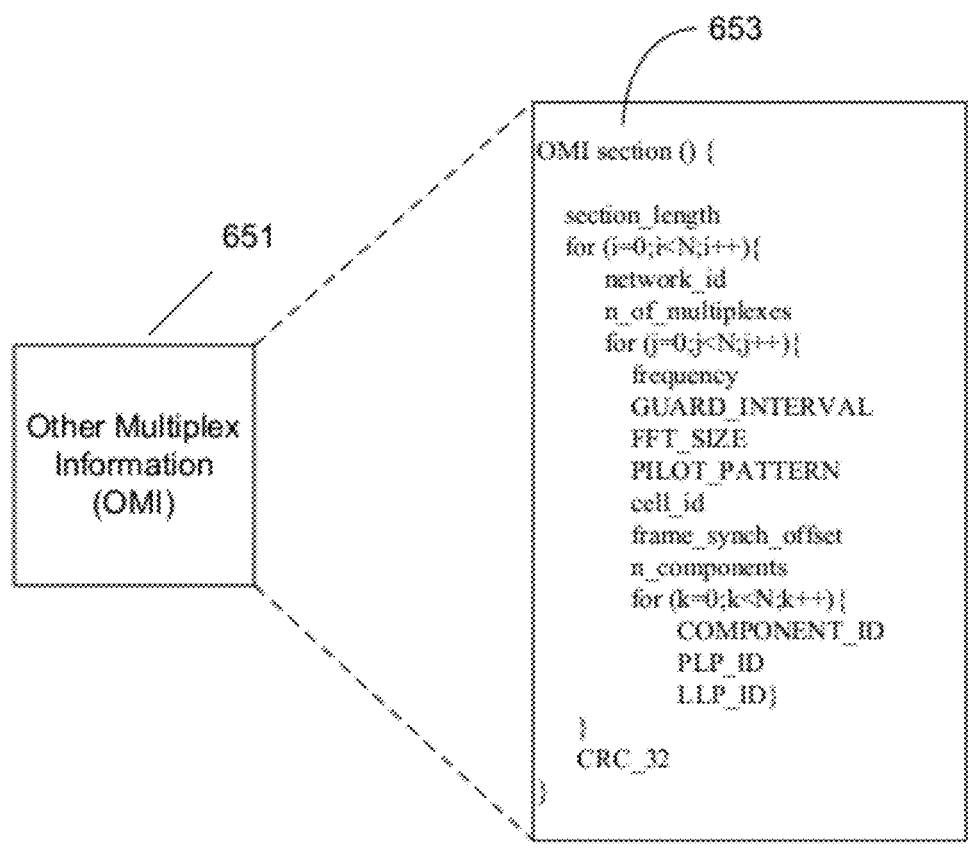

FIG. 6C illustrates an example signaling structure for other multiplex information 651 in accordance with the example L2 signaling data of FIG. 6A, OMI 651 lists components carried within the local multiplex, which are also available within other multiplexes located within signals adjacent to the currently received signal. As illustrated in FIG. 6C, other multiplex information 651 is represented by OMI section 653. Some embodiments of OMI section 653 may incorporate a nested sequence of data elements. In FIG. 6C, this nested sequence of data elements is for convenience represented by loop pseudocode. Other embodiments may incorporate a simplified structure in which local multiplex information 651 is represented by a section that is pre-defined (e.g., predefined length and section structure).

Referring to the information included within the OMI section 653, a section length parameter (e.g., section_length) may indicate the number of neighboring networks. In the representation of FIG. 6C, section length indicates the number of iterations of the loop following the section_length parameter. In an actual OMI signaling structure, the section_length parameter could represent a number of consecutive data blocks, with each of those blocks including data of the types described below and corresponding to other parameters in FIG. 6C between "for (i=0;i<N;i++){" and "CRC_32". In another example, section length in the actual OMI signaling structure may indicate the entire length of the section, including all possible loops.

A network identifier (e.g., network_id) may be used for uniquely identifying a network, such as a network associated with a neighboring cell.

A number of multiplexes parameter (e.g., n_of_multiplexes) may be used for indicating to indicate the number of multiplexes (e.g., signals) available in the neighboring network identified by network_id. In the representation of FIG. 6C, n_of_multiplexes indicates the number of iterations (e.g., "N") of the loop following the n_of_multiplexes parameter. In an actual OMI signaling structure, the n_of_multiplexes parameter could represent a number of consecutive data blocks, with each of those blocks including data of the types described below and corresponding to other parameters in FIG. 6C between "for (j=0;j<N;j++){" and "LLP_ID}"

A frequency field (e.g., frequency) may be used for indicating a frequency of the signal carrying the associated multiplex for that iteration of the loop. The associated multiplex may be in a signal covering an area of the neighboring cell. The indicated frequency may be the channel center frequency.

A guard interval field (e.g., GUARD_INTERVAL) may be used for indicating the guard interval of the current super-frame of the associated multiplex (e.g., signal).

A fast Fourier transfer (FFT) size parameter (e.g., FFT_SIZE) may be used for indicating the FFT size (e.g., 2K, 8K, etc.) of the current frame type in the associated multiplex. The multiplex may include also other types of frames, for example, future extension frames, which may have a different FFT size.

A pilot pattern parameter (e.g., PILOT_PATTERN) may be used for indicating the pilot pattern of the signal. In one example, PILOT_PATTERN indicates the scattered pilot pattern used for the data Orthogonal Frequency Division Multiplexing (OFDM) symbols of the associated multiplex.

A cell identifier (e.g., cell_id) may be used for identifying a cell. In one example, each cell may be unique within one network.

A frame offset parameter (e.g., frame_synch_offset) may be used for indicating the frame offset between the physical layer frame transmitted within the current multiplex (e.g., the multiplex the receiving device is currently receiving) and the physical layer transmitted within the associated multiplex (e.g., a multiplex of the neighboring cell).

For each associated multiplex (e.g., for each "j"), a parameter indicating a number of services/components for that multiplex (e.g., n_components) may indicate the number of components within the multiplex. In the representation of FIG. 6C, n_components indicates the number of iterations for the loop following n_components. In an actual OMI signaling structure, the n_components parameter could represent a number of consecutive data blocks, with each of those blocks including data of the types described below and corresponding to other parameters in FIG. 6C between "for (k=0;k<N;k++){" and "LLP_ID}".

In FIG. 6C, COMPONENT_ID may provide an indexed identification for services/components within the current and neighboring multiplexes. The COMPONENT_ID may be unique in each multiplex, and thus may be reused for identifying the current and adjacent services/components. Using COMPONENT_ID may advantageously reduce the needed signaling capacity, since a COMPONENT_ID may be shorter than the corresponding unique resource identifier. For each service/component, a LLP and PLP are identified with LLP_ID and PLP_ID.

Figure 6D:
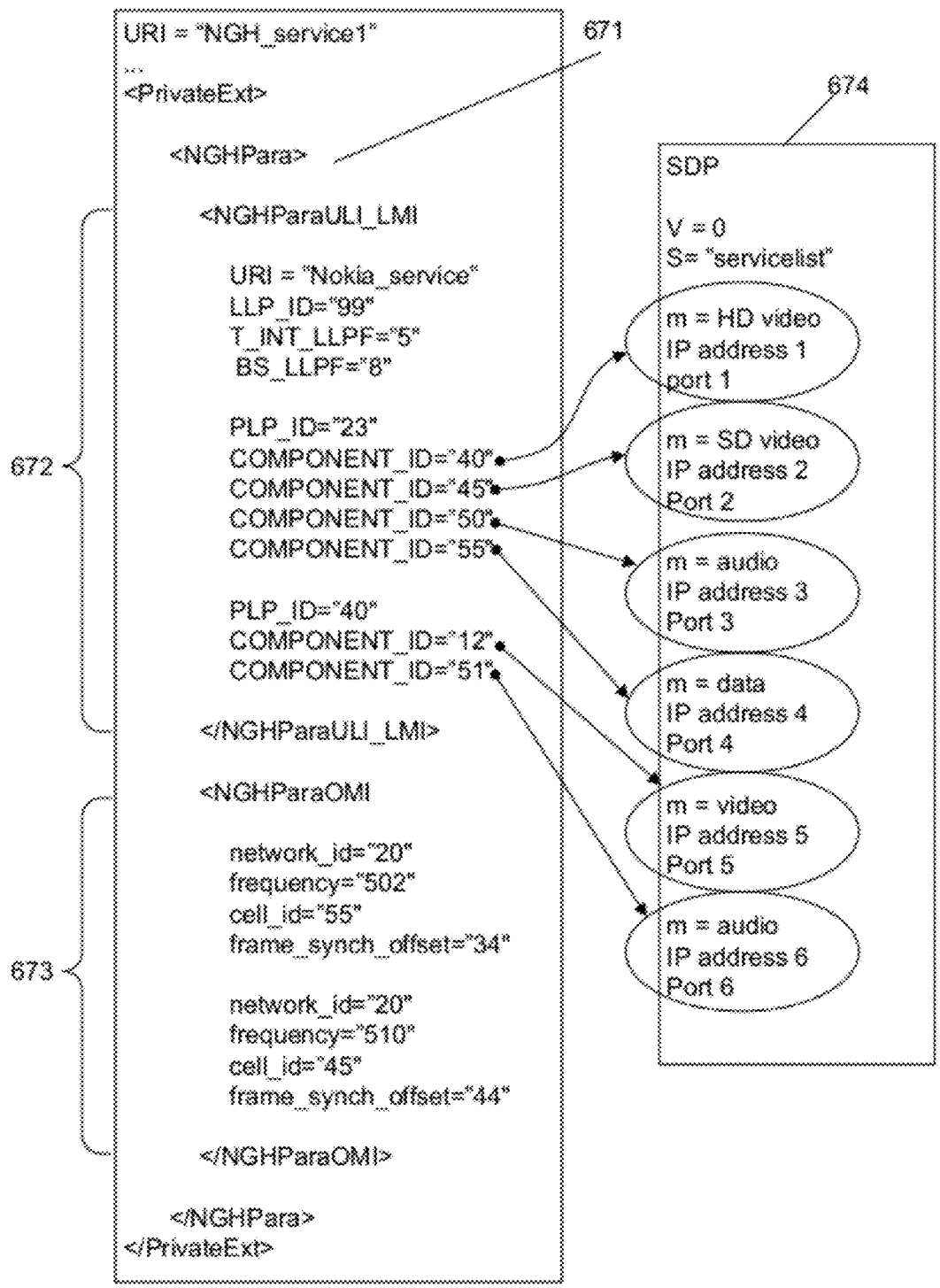

FIGS. 6A, 6B, and 6C illustrate one format of signaling data. Other embodiments may format the signal data in other manners depending on the application. For example, FIG. 6D illustrates another example of signaling data carried within the SGDD and/or fragments as illustrated in FIGS. 4C-4G. If the signaling data is within a fragment, the fragment may be identified with a URI, such as URI="NGH_service1." The signaling data is organized into one NGHPara section 671, which carries the same ULI, LMI, and OMI data illustrated in FIGS. 5, 6B, and 6C for one service identified by the URI parameter within the NGHPara section 671 (e.g., URI="Nokia_service"). Section 671 may be within a private extension field of a fragment or SGDD. The selection of parameters listed in section 671 is illustrative only, and certain parameters may be added or subtracted as required by the service and protocol requirements. Multiple instances of NGHPara may be included to identify and describe multiple services respectively. NGHPara includes two subsections.

The first subsection 672, labeled NGHParaULI_LMI includes signaling data similar to the data described with respect to FIGS. 5 and 6B. Below the URI parameter, which identifies the service, the LLP identifier parameter (e.g., LLP_ID) may be used to identify each LLP associated with the service. In this example, only one LLP is identified, although more than one LLP may be associated and identified per service. A time interval parameter (e.g., T_INT_LLPF) may be used to indicate the time between LLP frames in a transmission (e.g., milliseconds, OFDM symbols). A maximum size parameter (e.g., BS_LLPF) may be used to indicate the size of the largest frame within an LLP.

Every LLP identified is associated with one or more PLPs identified by PLP_IDs (e.g., PLP_ID="23", PLP_ID="40"). For every PLP, a set of elements carried in the PLP and associated with the service are identified by unique COMPONENT_IDs. In the example of FIG. 5, the signaling data also identifies location information such as an IP address/port for locating each component. In the example of FIG. 6D, already existing SG data may be leveraged to provide the same location and other information for the components as in FIG. 5. As previously discussed, the SG may include session description information, which may be formatted according to the Session Description Protocol (SDP). Example SDP formatted information is shown as 674. The SDP data includes a number of entries. Those entries tagged with an "m=" identify a media component and address for accessing the media component. The examples illustrated in SDP data 674 are multimedia components, but other types of components may be included. The SDP data may be included in various locations within the SG, such as in access fragments, session description fragments, or in fragments dedicated to carrying signaling data. Examples of SDP data locations are included in FIGS. 4E, 4F, and 4G.

In the example of FIG. 6D, each COMPONENT_ID is associated with a media component in the SDP data by the order in each file (i.e., the first COMPONENT_ID listed in 671 is associated with the first media component entry in the SDP data 674). While this example utilizes SDP data, other SG data may be used, such as MBMS User Service Bundle Description data (MBMS-USBD), as defined in standard 3GPP TS 26.346 or as defined by some other standard. By utilizing the data already in the SG, the signaling data may be reduced. Carrying the signaling data within the SG further adds efficiency in accessing the shared signaling/ESD data. In various embodiments, the signaling data and SDP data may be located in a common SG fragment as illustrated in FIGS. 4E and 4G. For example, signaling data 671 in FIG. 6D may be the signaling data in the private extension field 452, 472, and 482 in FIGS. 4E-4G, and the SDP data 674 in FIG. 6D may be the embedded SDP data 451, 471, and 485 in FIGS. 4E-4G. Such a configuration has an advantage in that all of the information required to link a service from upper level layers down to the physical layer may be found by receiving and decoding one fragment, which greatly improves system efficiency and avoids fragmentation issues of having signaling data spread across several layers. In various embodiments, the access fragment and SDP data may be compatible with the OMA BCAST ESG standard over DVB-H, and the signaling data may be formatted according to the DVB-NGH standard.

Subsection 673 in FIG. 6D is labeled as NGHParaOMI and is similar to the OMI data illustrated in FIG. 6C. The NGHParaOMI subsection identifies neighboring frequencies carrying the same service identified by the URI parameter. The service may be carried on a number of neighboring frequencies, and thus a number of neighboring frequencies may be identified in NGHParaOMI. The NGHParaOMI section may include, for each neighboring frequency carrying the service, a network identifier (e.g., network_id), which may be used for uniquely identifying a network, such as a network associated with a neighboring cell. A frequency field (e.g., frequency) may be used for indicating a frequency of the signal carrying the associated multiplex carrying the service identified by the URI parameter. The associated multiplex may be in a signal covering an area of the neighboring cell. The indicated frequency may be the channel center frequency. A cell identifier (e.g., cell_id) may be used for identifying a cell. In one example, each cell may be unique within one network. A frame offset parameter (e.g., frame_synch_offset) may be used for indicating the frame offset between the physical layer frame transmitted within the current multiplex (e.g., the multiplex the receiving device is currently receiving) and the physical layer transmitted within the associated multiplex (e.g., a multiplex of the neighboring cell). Other parameters, such as a guard interval, an FFT size parameter, and a pilot parameter as described with respect to FIG. 6C may also be included.

As previously discussed, the SG is delivered in fragments in SDGUs, which are mapped by one or more SGDDs. Further, the signaling data may be in a fragment in the SDGUs or in the SGDDs. In order to assemble and access the SG, and thus the embedded signaling, the SGDD must first be retrieved and decoded before any of the fragments and signaling data may be retrieved. To aid in this process, the SGDDs may delivered in one or more dedicated transport sessions, which may be identified as a service guide announcement channel. The service guide announcement channel may be a transport session, such as an ALC/FLUTE session for delivering the SGDDs. The broadcast system may provide the signaling for the service guide announcement channel in a number of ways. For example, the announcement channel may be addressed to a predetermined multicast IPv4 or IPv6 address/port, which is known by client devices prior to retrieving announcement channel. In another variation (as further discussed below), the service guide announcement channel may be located in a predetermined and fixed PLP, which is shared a priori and known by the client devices prior to retrieving announcement channel.

Various embodiments may also include a service guide bootstrap session, which may announce and provide location information for the announcement channels of one or more service guides available for download. The service guide bootstrap session may be located at a fixed IP address, or may be located in a fixed PLP.

Other signaling requirements for receiving the SGDD may also be provided and defined by the broadcast system. In another variation in an interactive channel, a URL may be provided, which resolves to a session description, which describes the file distribution session (e.g., ALC/FLUTE session) carrying the announcement information. In this way, the client device may send a request for the information to the URL. In some variations, the URL may be discovered using a DNS query to a DNS server. The queried name may be predetermined to identify the file delivery session carrying the SGDD.

Figure 7:
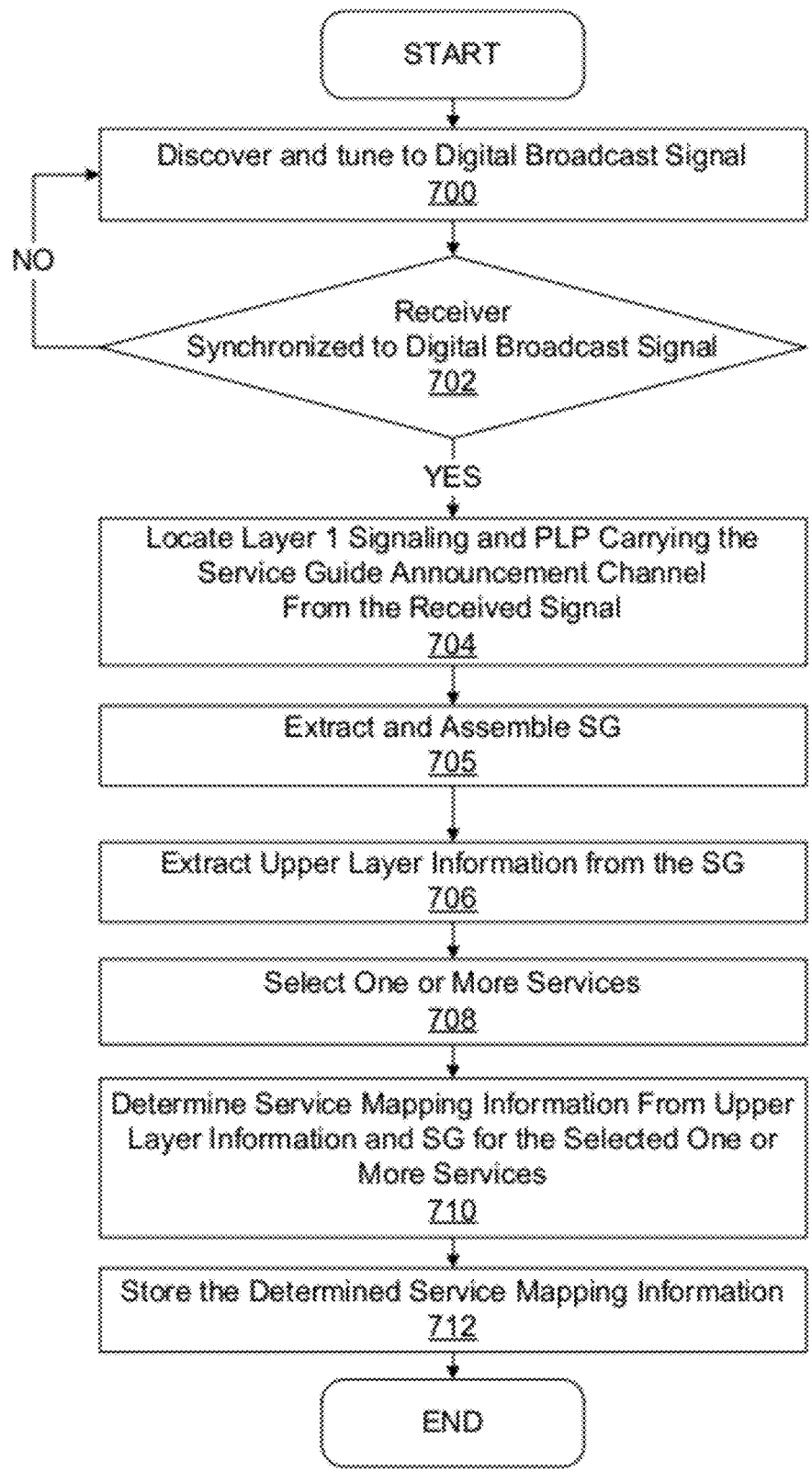
FIG. 7 illustrates an example method for processing layer 1 signaling and upper layer information according to one or more embodiments described herein.
Figure 8:
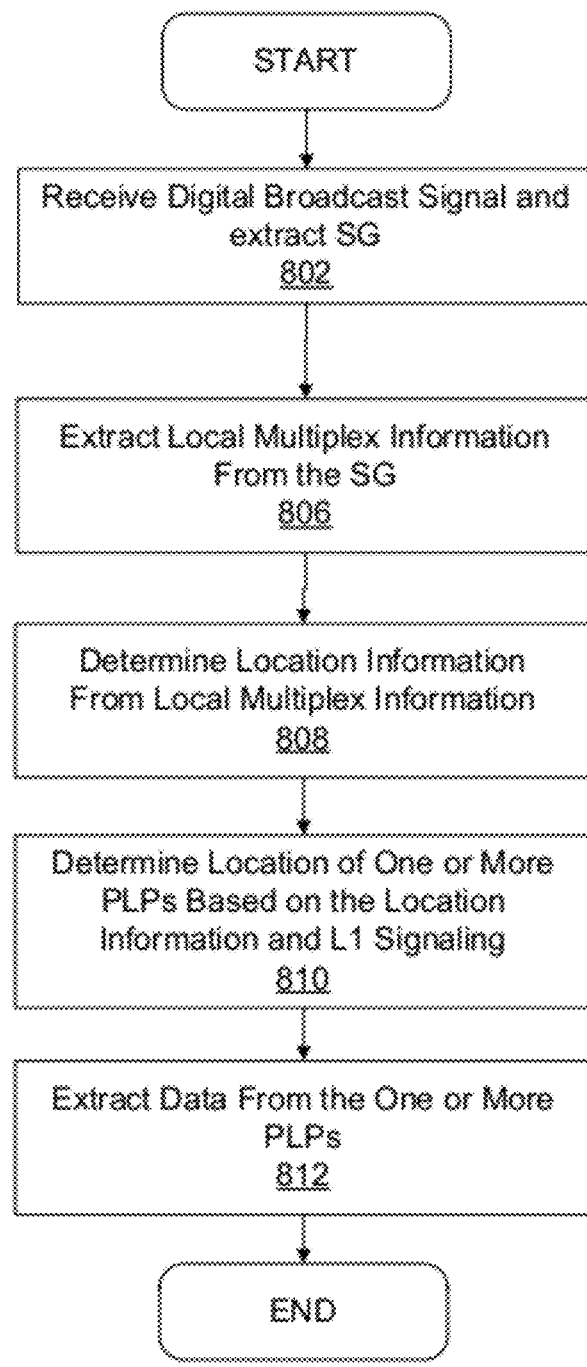
FIG. 8 illustrates an example method for processing local multiplex information according to one or more embodiments described herein.

To locate the PLPs carrying data for consumption at an electronic device (e.g., video and/or audio components of a service for viewing, playback, etc.), processing of signaling parameters included in the upper layer information and local multiplex information may be performed. FIGS. 7 and 8 illustrate example methods for processing the upper layer information and local multiplex information, respectively. The methods may be implemented, for example, by a processor or other element in a receiving device, such as, but not limited to, mobile communication device 105, mobile phone 110, personal digital assistant (PDA) or mobile computer 120, and personal computer (PC) 115 depicted in FIG. 1A. The receiving device may begin processing the signaling data by performing the example process illustrated in FIG. 7.

FIG. 7 illustrates an example method for processing layer 1 signaling and upper layer information, which may be performed by, e.g., devices 105, 110, 112,115, and 120. At steps 700 and 702, a digital broadcast signal (e.g., a DVB-NGH signal) may be received, by first discovering and tuning to the broadcast signal in step 700, and then determining if the receiver is synchronized to the broadcast signal in step 702. If the receiver is not synchronized, step 700 is repeated. If the receiver gets synchronization, then at step 704, the layer 1 (L1) signaling and PLP carrying the service guide announcement channel may be located from the received signal. Upon locating the L1 signaling and the PLP carrying the service guide announcement channel, the L1 signaling and one or more SGDDs may be decoded from the signal.

In step 705, based on the SGDDs, the Electronic Service Guide is extracted and assembled. In some variations, the entire SG is assembled, and in other variations, the SG is only assembled to the extent needed to retrieve the upper layer signaling. For example, if the upper layer signaling is appended to the SGDD, in some cases only the SGDD need be assembled. In other variations, such as the one illustrated in FIG. 6D, SDP data within the SG is also needed to extract the ULI, and thus more of the SG must be extracted and assembled. In another variation, if the SDP and signaling data are collated in one access fragment as illustrated in FIG. 4E, only the access fragment need be received. At step 706, the ULI may be extracted from the SG data. In some instances, this can include separating the ULI from the additional signaling information included in the SG carrying the ULI. In some variations, the ULI is extracted from the SGDD. In other variations, the ULI is extracted from a SG fragment, such as an access fragment, which may be identified in the SGDD or by another SG fragment.

At step 708, one or more services (e.g., the one or more desired services) may be selected. In one example, a service may be selected (e.g., by a user of the receiving device via a user interface or autonomously by an application executed by the receiving device). A service identifier (e.g., a URI) for the selected service may then be discovered. For example, a receiver may analyze SG information assembled in step 705 and stored at the receiver to identify a URI for a desired service.

At step 710, service mapping information for the selected one or more services may be determined from the upper level information. For example, the upper level information (e.g., the service_association section 503 of FIG. 5, NGH-ParaULI_LMI of FIG. 6D) may be processed and/or decoded to determine the component parameters (e.g., URIs, LLP_IDs and PLP_IDs of FIG. 5) of the selected one or more services. For example, the PLP_IDs may be associated with the identified URI for the desired service(s) in the SG. In one instance, the component parameters are identified by locating a component identifier field (e.g., COMPONENT_ID shown in FIGS. 5 and 6D) associated with a matching URI included in the upper level information. Each URI may be associated with one or more component identifiers (e.g., an identifier for each component of the desired service). In some embodiments, each desired service may be associated with one or more components respectively transporting audio data, video data, text data, etc. Each URI may be associated with a similar number of component identifiers. Referring to the service_association section 503 of FIG. 5, a matching URI may be located in the service association section 503 by locating a string of URI_bytes that match the desired URI. The matching URI may similarly be found in the NGHParaULI_LMI section of FIG. 6D. Referring again to step 710 of FIG. 7, as another example of service mapping information, the upper level information may be processed and/or decoded to determine LLP identifiers (e.g., LLP_IDs of FIGS. 5 and 6D) associated with the PLP_IDs.

At step 712, the determined mapping information (e.g., the component parameters determined in step 710) may be stored (e.g., in a memory of the receiving device) for later access.

Upon retrieving and/or storing the service mapping information, the receiving device may continue processing the signaling data by performing the example process illustrated in FIG. 8.

FIG. 8 illustrates an example method for processing local multiplex information (LMI), which may be performed by, e.g., devices 105, 110, 112,115, and 120. At step 802, a digital broadcast signal (e.g., a DVB-NGH signal) may be received and the SG extracted and assembled (e.g., as in steps 700 through 705 of FIG. 7).

At step 806, the LMI may be extracted from the SG. Similar to extraction of the ULI, in some instances, this can include separating the LMI from the additional signaling information included in the SG (e.g., separating the LMI from the ULI). In some variations, the LMI is extracted from the SGDD (e.g., FIG. 4C). In other variations, the LMI is extracted from SG fragments, such as an access fragment, which may be identified in the SGDD or by another SG fragment (e.g., FIG. 4D). In yet other variations, the LMI is extracted from the SGDD along with additional information from the SG (e.g., SDP data in FIG. 6D) or from a SG fragment along with SDP data (e.g., FIGS. 4E and 4G).

At step 808, location information may be determined from the extracted LMI section. For example, for each LLP_ID found in the last step of FIG. 7, the local multiplex information (e.g., the LMI section 603 of FIG. 6B and section 672 of FIG. 6D) may be processed and/or decoded to determine further related PLP identifiers (e.g., PLP_IDs of FIGS. 6B and 6D) corresponding to the selected one or more services (e.g., URIs, COMPONENTS_IDs determined in FIG. 7 from the ULI). In one instance, the PLP identifiers are identified by locating the PLP identifiers associated with a matching component identifier included in the local multiplex information. As another example, for each LLP_ID stored in step 712 of FIG. 7, the local multiplex information may be processed and/or decoded to determine buffer information (e.g., T_INT_LLPF and BS_LLPF of FIG. 6B). In some embodiments, the buffer information may be identified from the LMI by locating the buffer information associated with a matching LLP identifier included in the LMI (e.g., an LLP_ID included in LMI section of FIG. 6B matching an LLP_ID determined in FIG. 7 from the ULI). In some embodiments, the location multiplex information (e.g., the buffer information and PLP identifiers) may be stored (e.g., in a memory of the receiving device) for later access.

At step 810, the location of one or more PLPs is determined based on the location multiplex information and L1 signaling. For example, the location multiplex information (e.g., the buffer information and PLP identifiers) and the L1 signaling (e.g., the L1 signaling extracted and stored in the method illustrated by FIG. 7) may be used to identify the physical location of the PLP that corresponds to a component of the desired service(s). At step 812, upon locating the one or more PLPs, data of the desired service(s) from the one or more PLPs may be extracted and subsequently consumed (e.g., processed for viewing, playback, etc.) at the receiving device (or transmitted to another terminal for consumption at the terminal).

The receiving device may require a handover to be performed. In one example, the receiving device may initiate a handover from a first cell to a second cell. The receiver may attempt to continue receiving and/or consuming the desired service(s) currently being received and/or consumed by the receiving device. A handover procedure, in some embodiments, may include using information included in the other multiplex information (e.g., OMI 653 of FIG. 6A, OMI 673 of FIG. 6D).

Figure 9:
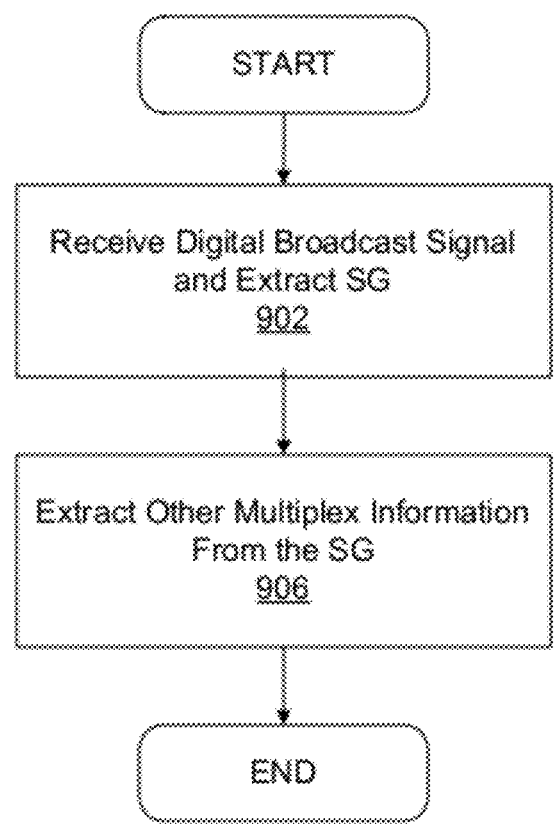
FIG. 9 illustrates an example method for processing other multiplex information according to one or more embodiments described herein.

FIG. 9 illustrates an example method for processing other multiplex information, which may be performed by, e.g., devices 105, 110, 112,115, and 120. At step 902, a digital broadcast signal (e.g., a DVB-NGH signal) and the SG with the digital broadcast signal may be received, extracted and assembled in the same manner as in steps 700 and 705 of FIG. 7.

At step 906, the OMI may be extracted from the SG. Similar to the extraction of the ULI and/or the LMI, in some instances, this can include separating the OMI from the additional signaling information included in the SG (e.g., separating the OMI from the ULI, LMI and/or other OMIs). In some variations, the OMI is extracted from the SGDD (e.g., FIG. 4C). In other variations, the OMI is extracted from SG fragments, such as an access fragment, which may be identified in the SGDD or by another SG fragment (e.g., FIG. 4E). In yet other variations, the OMI is extracted from the SGDD along with additional information from the SG (e.g., SDP data in FIG. 6D).

In FIGS. 7, 8, and 9, the processing of the UMI, LMI, and OMI are illustrated as separate steps. In alternate embodiments, the processing of the UMI, LMI, and OMI may be combined.

Figure 10:
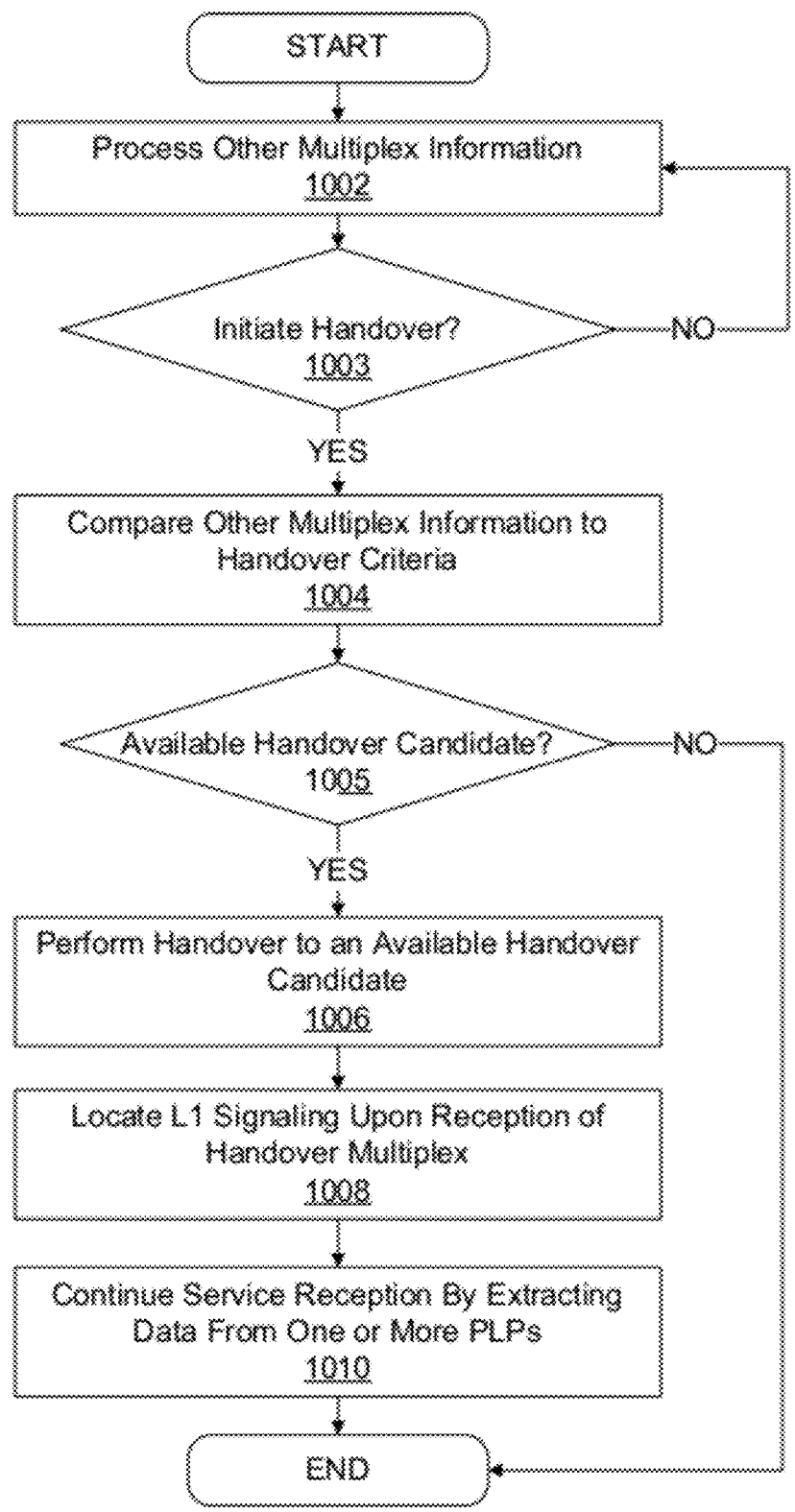
FIG. 10 illustrates an example method for performing a handover according to one or more embodiments described herein.

FIG. 10 illustrates an example method for performing a handover, which may be performed by, e.g., devices 105, 110, 112, 115, and 120. At step 1002, the other multiplex information may be processed. In some embodiments, this may proceed in a manner that is the same or similar to the method illustrated in FIG. 9. At step 1003, a determination may be made whether to initiate a handover. In some embodiments, a handover may be initiated based on one or more thresholds being reached, such as a signal strength threshold. In one example, a handover may be initiated when the receiving device moves from a first cell to a second cell of the network. If it is determined to initiate a handover, the handover may be initiated and the method may proceed to step 1004. Otherwise, the method may proceed to step 1002, where OMI information may be processed again. Such re-processing may include updating OMI information with updated OMI information and/or extracting new OMI information. For example, a new digital broadcast signal may be received that includes updated OMI information. The updated OMI information may be extracted (e.g., similar to the method illustrated in FIG. 9) and/or stored for later access. In certain variations, the updating is based on an inspection of changes in transport object identifiers and version numbers of transport objects carrying the SGDUs and SGDDs carrying the OMI.

At step 1004, a handover has been initiated and the OMI may be compared to handover criteria. The OMI together with the SG may list one or more (e.g., some or all) components carried within the current multiplex (e.g., the multiplex, or signal, the receiving device is currently tuned to) and/or other multiplexes (e.g., the multiplexes not currently tuned to, but available to the device, such as multiplexes of neighboring cells or other multiplexes of the current cell). In one example, each multiplex may be included in the OMI and may have a respective list of components that are carried within the multiplex. Components listed in the OMI may use the same component identifiers as the component identifiers found in the ULI and/or the LMI (e.g., COMPONENT_IDs).

In some embodiments, the handover criteria may be one or more services currently being received and/or consumed by the receiving device. Additionally and/or alternatively, the handover criteria may include one or more services recently received and/or consumed by the receiving device, and/or may include one or more services predicted to be received and/or consumed by the receiving device (e.g., a prediction based on reception and/or consumption habits of a user at the receiving device). These services may be represented in the handover criteria by their component identifiers. Comparing the OMI to the handover criteria may include identifying one or more multiplexes of the OMI that include a listing of component identifiers that match the component identifiers of the handover criteria. In one instance, one or more multiplexes of the OMI may be identified by the comparison against handover criteria representing the services currently being received and/or consumed by the receiving device. In this instance, these identified multiplexes carry the services currently being received and/or consumed by the receiving device.

In some embodiments, the comparison may compare the handover criteria to every multiplex included in the OMI. In others, the comparison may compare the handover criteria until a first matching multiplex is identified in the OMI. In yet others, the comparison may compare the handover criteria until a threshold number (e.g., 2, 3, 4, etc.) of matching multiplexes are identified in the OMI. Additionally, the information for the identified matching multiplexes may be extracted from the OMI and/or stored for later access. For example, referring to the OMI section 653 of FIG. 6C or section 673 of FIG. 6D, the various parameters associated with a particular matching multiplex may be extracted and/or stored. The extracted and/or stored parameters may include a network identifier (e.g., network_id of OMI section 653 of FIG. 6C and section 673 of FIG. 6D) of the matching multiplex, a frequency parameter (e.g., frequency of OMI section 653 of FIG. 6C and section 673 of FIG. 6D) of the matching multiplex, a guard interval parameter (e.g., GUARD_INTERVAL of OMI section 653 of FIG. 6C and section 673 of FIG. 6D) of the matching multiplex, a FFT size parameter (e.g., FFT_SIZE of OMI section 653 of FIG. 6C and section 673 of FIG. 6D) of the matching multiplex, a pilot pattern parameter (e.g., PILOT_PATTERN of OMI section 653 of FIG. 6C and section 673 of FIG. 6D) of the matching multiplex, a cell identifier (e.g., cell_id of OMI section 653 of FIG. 6C and section 673 of FIG. 6D) of the matching multiplex, a frame offset parameter (e.g., frame_synch_offset of OMI section 653 of FIG. 6C and section 673 of FIG. 6D) of the matching multiplex, the various component identifiers (e.g., COMPONENT_IDs of OMI section 653) of the matching multiplex, the various PLP identifiers corresponding to the component identifiers (e.g., PLP_IDs of OMI section 653 of FIG. 6C and section 673 of FIG. 6D) of the matching multiplex, and/or the various LLP identifiers corresponding to the component identifiers (e.g., LLP_IDs of OMI section 653 of FIG. 6C and section 673 of FIG. 6D) of the matching multiplex.

Referring again to FIG. 10, at step 1005, a determination is made whether there are any available handover candidate multiplexes. For example, if one or more multiplexes are identified in the OMI that match the handover criteria (e.g., there is at least one multiplex in the OMI that carries the services currently being received and/or consumed by the receiving device), it may be determined that there are available handover candidates. The process may then proceed to step 1006. Otherwise, the process may end and/or announce (e.g., present an indicator on a display, illuminate a lamp, produce a sound, etc.) that there are not any available candidates. Such an announcement may include announcing that handover is not possible and/or that service disruption would result if handover is performed.

At step 1006, the handover to an available handover candidate multiplex is performed. The handover may include selecting a handover multiplex from the available handover candidate multiplexes and starting reception of the handover multiplex. In some instances, the handover multiplex may be a different frequency than the current multiplex. Selecting the handover multiplex may be performed in various ways, including, for example: selecting the first available candidate multiplex; selecting based on multiplex priority (e.g., multiplexes having certain parameter and/or identifier values, such as network identifier and/or cell identifier, may be given priority over other multiplexes having different parameter/identifier values); and/or selecting based on other criteria (e.g., signal strength of the available multiplexes). The handover may be performed using the information of the selected handover multiplex that was extracted from the OMI (e.g., the parameters and/or identifiers extracted from OMI section 653 of FIG. 6C and 673 of FIG. 6D). For example, a frame offset parameter may be used when starting the reception of a frame (e.g., a DVB-NGH frame) carried by the new multiplex. Use of the frame offset may, for example, enable the correct timing and/or prevent delay of the frame synchronization.

At step 1008, upon reception of a signal of the handover multiplex, the L1 signaling is located. The L1 signaling may then be extracted for use by the receiving device. In conjunction with the information for the handover multiplex extracted from the OMI (e.g., component identifiers, PLP identifiers, LLP identifiers, etc.), the L1 signaling may provide the receiving device the information needed to locate and extract information from PLPs carrying the data for the desired services. In some embodiments, the receiving device may proceed immediately with locating and extracting information from the PLPs carrying the data for the desired services so that the receiving device may continue receiving and/or consuming the desired services. For example, there may be no need to locate and process ULI and LMI information (e.g., the example methods illustrated in FIGS. 7 and 8), and those processes may be skipped and/or not performed.

At step 1010, reception of the desired services may be continued by extracting data from one or more PLPs of the desired service from the received signal of the handover multiplex. Extracting the data may include locating the one or more PLPs using the L1 signaling located in step 1008 and the information of the handover multiplex extracted from the OMI. For example, the one or more PLPs may be located (e.g., the physical location of the one or more PLPs may be determined) based on the L1 signaling, the component identifiers of the handover multiplex, the PLP identifiers of the handover multiplex, and/or the LLP identifiers of the handover multiplex.

Figure 11:
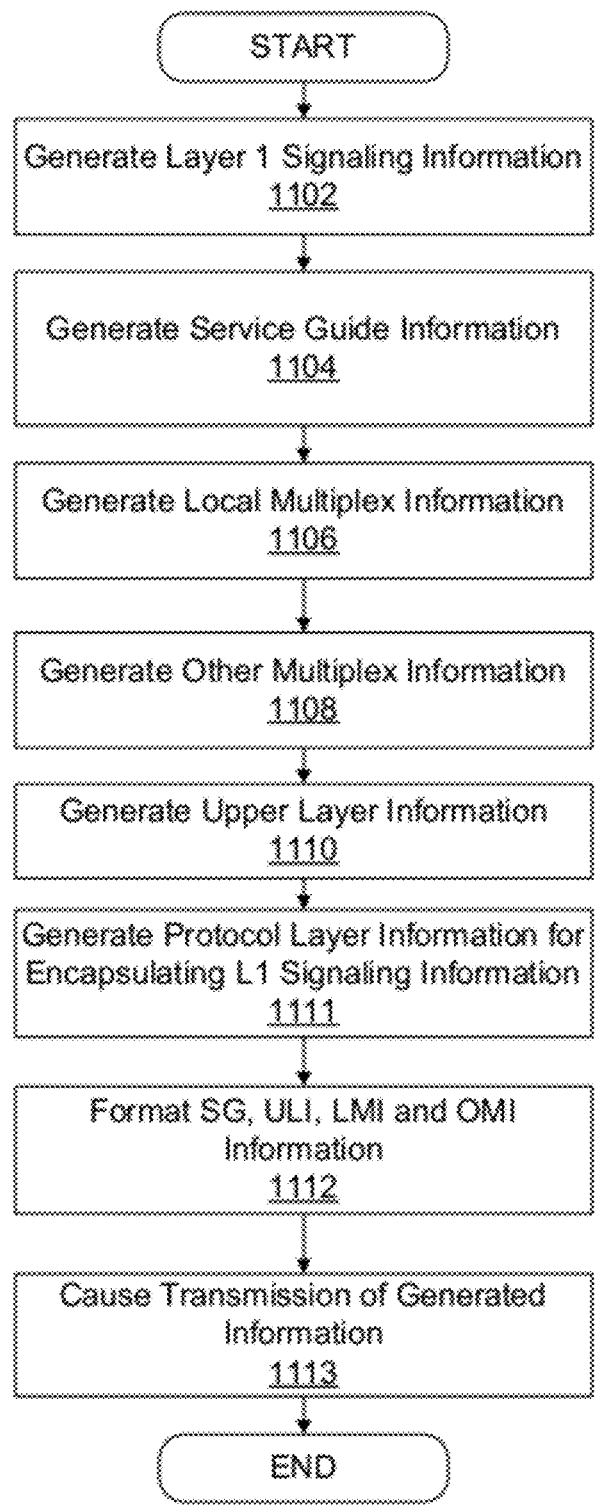
FIG. 11 illustrates an example method for communicating signaling parameters according to one or more embodiments described herein.

FIG. 11 illustrates an example method for communicating signaling parameters, which may be performed by, e.g., service provider 125, content provider/server 130, digital content sources 104, and digital broadcast transmitter 103. The example method of FIG. 11 may be implemented, for example, by a processor or other element, in one or more various devices and apparatuses of a content provider and/or a service provider (e.g., service provider 125 of FIG. 1A, content provider server 130 of FIG. 1A, digital content sources 104 of FIG. 1B, digital broadcast transmitter 103 of FIG. 1B, transmitter 101 of FIG. 1B, etc.). The various devices and apparatuses may include at least one processor and at least one memory. Additionally, the various devices and apparatuses may include receiving and/or transmitting circuits and hardware interfaces for the transmitting and receiving of signals from the devices and apparatuses. At step 1102, L1 parameters may be generated that associates indexes, such as a PLP identifier, with a physical location. At step 1104, service guide information that associates each service with a uniform resource identifier may be generated. At step 1106, local multiplex information may be generated that associates a component identifier with an index, such as a PLP identifier (e.g., information represented by the structure of LMI section 603 of FIG. 6B and LMI data in section 672 of FIG. 6D) is generated. In certain variation, this local multiplex information may be associated with information in the SG as illustrated in FIG. 6D.

At step 1108, other multiplex information may be generated that includes information related to one or more available multiplexes (e.g., information represented by the structure of OMI section 653 of FIG. 6C and LMI data in section 673 of FIG. 6D is generated). The information related to the one or more available multiplexes may include information for performing a handover to the available multiplex. Additionally, the information related to the one or more available multiplexes may include the indexes needed to access the physical location of data for one or more services (e.g., component identifiers, PLP identifiers, and/or LLP identifiers).

At step 1110, upper layer information is generated that associates a uniform resource identifier with one or more component identifiers (e.g., information represented by the structure of service association section 503 of FIG. 5 is generated). At step 1111, protocol layer information as described above may be generated to encapsulate the L1 signaling information. In step 1112, the SG information, the ULI, the LMI, and the OMI is formatted as described above. In certain variations, the SG information is formatted according to DVB-NGH. Step 1112 may include formatting the SG according to OMA BCAST ESG, and the ULI, LMI and OMI embedded within the OMA BCAST ESG as illustrated in FIGS. 4A-6D. At step 1113, transmission of the L1 signaling information, the SG information, the LMI, the OMI, and the ULI to a receiving device is caused to occur (e.g., the generated information is sent to a transmitter and/or transmitter antenna for transmission).

Referring back to FIGS. 7, 8, 9, the location of the SG within PLPs is determined in steps 704, 705, 802, and 902. To aid in this process, a protocol may include a SG bootstrap service, which includes SG descriptors carried in an ALC/FLUTE session, or some other file delivery session. The SG descriptors may include information, which identifies one or more SGs available for reception. The SG descriptors may for example point to one or more dedicated SG announcement sessions for each identified SG. Each SG announcement session may be an ALC/FLUTE session, or other file delivery session, dedicated for carrying the SGDDs of the SG. The SGDDs may then identify other SG delivery sessions (e.g., ALC/FLUTE sessions) which carry the SDGUs.

The broadcast system may provide the signaling for locating the SG bootstrap session, announcement, and delivery sessions in a number of ways. For example, the bootstrap session may be assigned a predetermined multicast IPv4 or IPv6 address/port, which is known by or stored in the client devices prior to receiving the bootstrap session. In another variation, a URL may be provided, which resolves to the bootstrap and/or announcement sessions. In this way, the client device may send a request to the URL, and receive information back, which indicates a location of the desired information. In some variations, the URL may be discovered using a DNS query to a DNS server. The queried name may be predetermined to identify the file delivery session carrying the announcement sessions.

In systems where the SG bootstrap session and announcement sessions are assigned a fixed pre-determined IP address, the location of the SG in the physical layer transmission may not be defined. That is, a receiving device (e.g., remote wireless terminal, cell phone, etc.) must go through the process of configuring the terminal to receive the specific IP service, which requires the reception and interpretation of PSI and SI signaling data to locate the data in the physical layer. As previously discussed, searching the PSI or SI signaling information in this way may be inefficient in some wireless communications systems, such as Digital Video Broadcasting-Handheld (DVB-H) systems.

To overcome this drawback and enable quick discovery of the SG (and the signaling data contained therein), various embodiments transmit the SG bootstrap session and/or the SG announcement sessions and/or the SG delivery sessions in dedicated and fixed PLPs, which are identified by data stored in a memory of the receiving electronic devices prior to receiving the SG announcement session. In one variation, the SG bootstrap, announcement, and delivery sessions are carried in the same PLP. In another variation, the SG bootstrap, announcement, and delivery sessions are carried in the different PLPs, which may belong to a group identified with a PLP_Group_ID parameter. In another embodiment, the SG PLP(s) are not fixed, and they are signaled by a dedicated PLP type in the L1 signaling. To enable fast discovery, some embodiments include the service guide bootstrap session in every physical layer frame.

Figure 12:
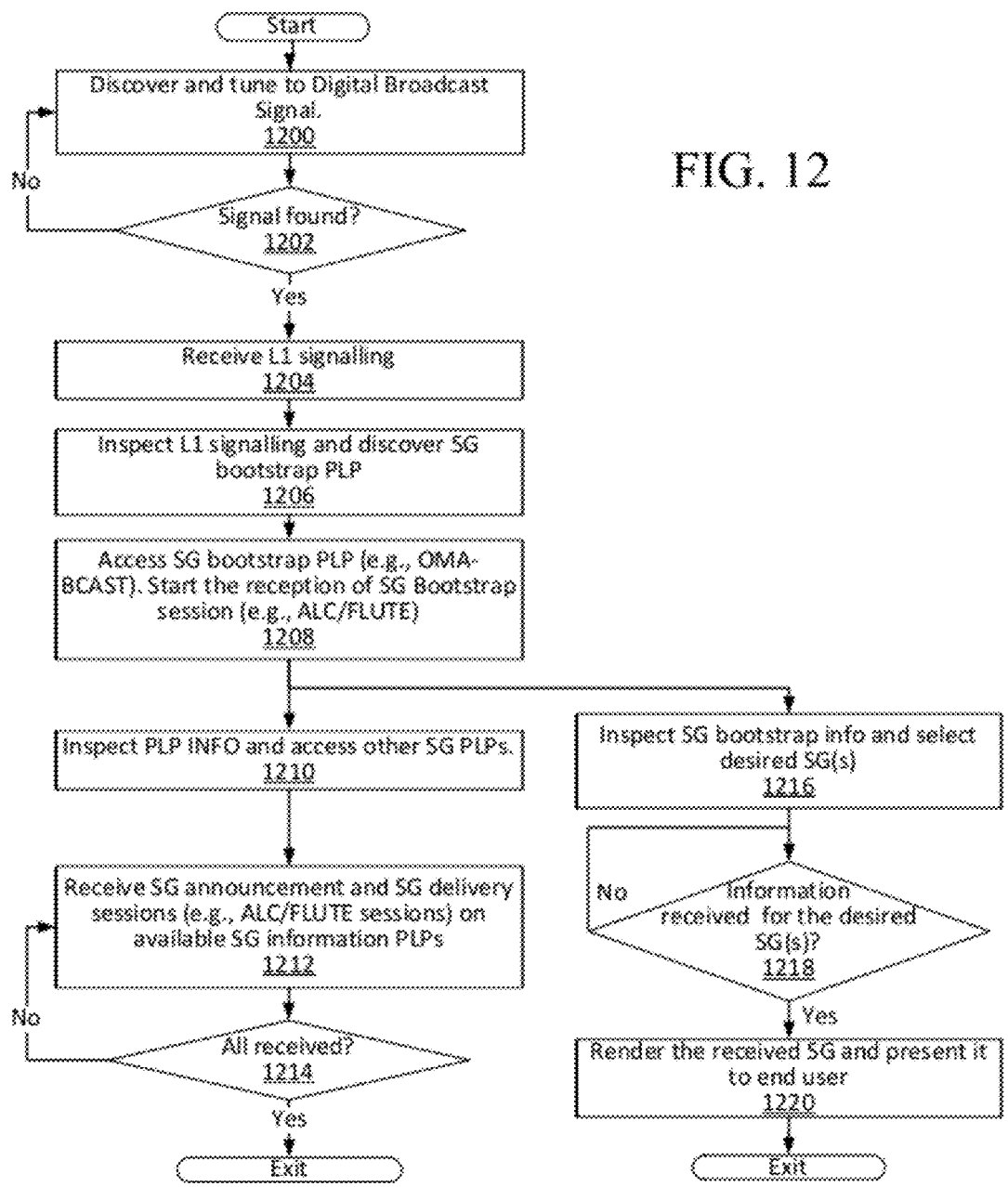
FIG. 12 illustrates an example method of service guide discovery.

FIG. 12 illustrates a method of service guide discovery, which may be performed by, e.g., devices 105, 110, 112, 115, and 120. At the beginning of the method, at step 1200, a digital broadcast signal is discovered and synchronized by searching for L1 signaling information contained in the physical layer protocol. For example, in a DVB-T2 or DVB-NGH system, to discover the physical layer frames, a receiving device may tune to P1 OFDM symbol to synchronize the receiving device and to retrieve information for retrieving the remainder of the physical layer frame. If the digital broadcast signals are not discovered in step 1202, the process returns to step 1200 to continue searching for the broadcast signals. If the broadcast signals are discovered in step 1202, the process proceeds to step 1204 to receive L1 signaling information, which provides the information required to identify, locate, and retrieve PLPs from the physical layer frames.

In step 1206, the L1 signaling information is inspected to discover the location of the PLP containing the service guide bootstrap session (i.e., the file delivery session containing the bootstrap information). The PLP containing the bootstrap session may be identified based on a static identification value (e.g. fixed PLP_ID) or a PLP_type field known to the receiving device. Alternately or additionally, a Bootstrap PLP info field (e.g., BS_PLP_info) may be added in the beginning of the PLP frame. Note that because the PLP containing the SG bootstrap service is known ahead of time by the receiving device, other PLPs do not need to be received and decoded in order to inspect PSI/SI information contained therein for finding the service guide information.

Figure 13:
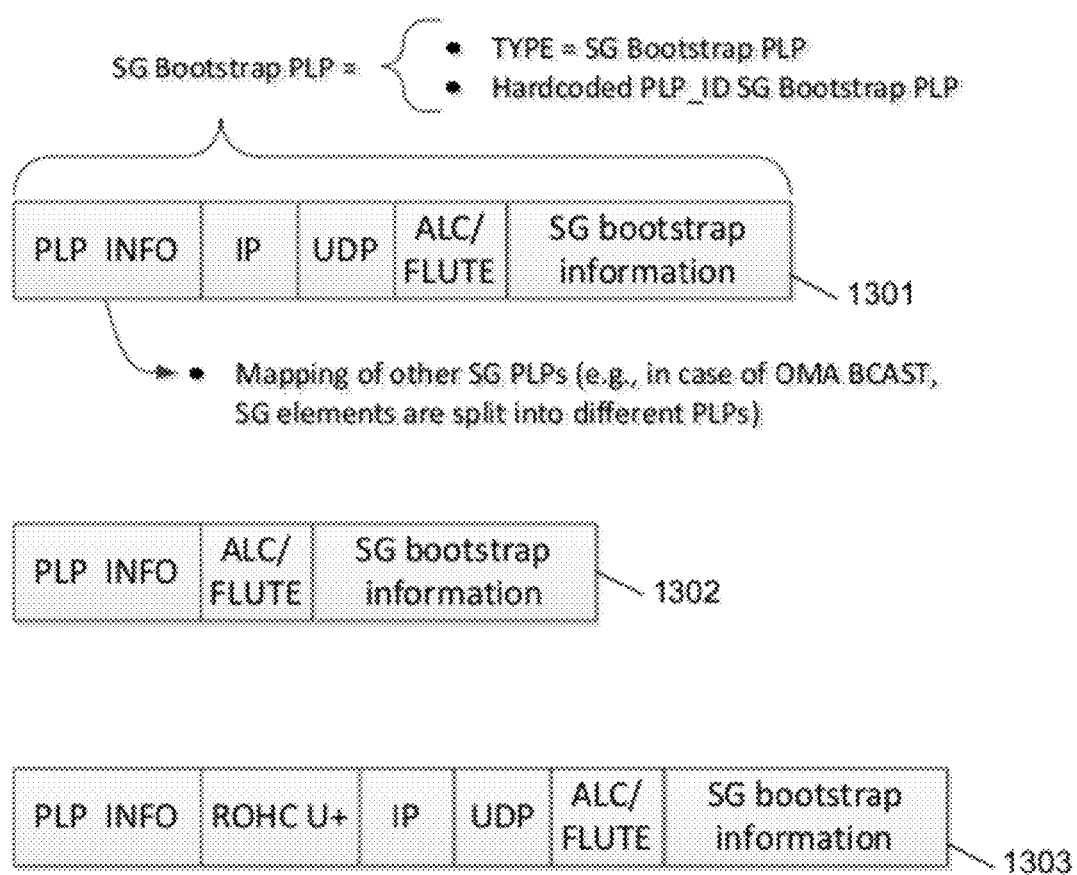
FIG. 13 illustrates examples of physical layer data streams including service guide discovery information.

FIG. 13 illustrates three sample embodiments for a PLP dedicated to carrying bootstrap information (i.e., the SG bootstrap PLP). In FIG. 13 encapsulation data (e.g., baseband headers, GSE headers, etc.), and other encapsulation data not needed for service guide discovery is not illustrated for convenience.

PLP 1301 illustrates a structure where no header compression is used and the protocol stack is supporting OMA BCAST delivery with ALC/FLUTE. At the beginning of PLP 1301, a bootstrap PLP information field (i.e., PLP INFO) includes header data used for identifying the PLP mapping data that identifies the locations (e.g., other PLPs) of other SG bootstrap information sessions, SG announcement information sessions, and SG delivery sessions. Following the PLP INFO field, IP layer headers (i.e., IP), transport layer headers (i.e., UDP), and session layer headers (i.e., ALC/FLUTE) are provided for upper layer processing of the bootstrap information. Following the header information, service guide bootstrap information is provided. The service guide bootstrap information may include information for identifying SG descriptors (e.g., provider and access descriptors), which may include information identifying one or more SGs available for reception. The SG descriptors may for example point to one or more dedicated SG announcement sessions for each identified SG, which may respectively point to one or more SG delivery sessions for that announcement session's SG.

PLP 1302 is identical to PLP 1301, except that the IP/UPD layers are not used. In another embodiment, the use of an ALC/FLUTE session is eliminated, and the service guide is carried encapsulated within some other upper level session protocol, or directly mapped within the physical layer without encapsulation. PLP 1303 is also identical to PLP 1301, except for the addition of Robust Header Compression (RoHC) information. In such case the header compression information may be static or it may be carried, e.g., within the PLP INFO field. Note that the order of data fields (e.g., PLP INFO, IP, UDP, etc.) illustrated in FIG. 13 are only a few possibilities. Other embodiments may include the same fields within the PLPs, but the fields may be organized in a different order.

In one embodiment, the service guide bootstrap session, announcement sessions, and delivery sessions are mapped into separate PLPs. If multiple SGs are included, the announcement session for each SG may be mapped into a separate PLP, or into a common SG announcement PLP. Delivery sessions for different SGs may also be mapped into separate PLPs, or into a common SG delivery PLP.

Figure 14:
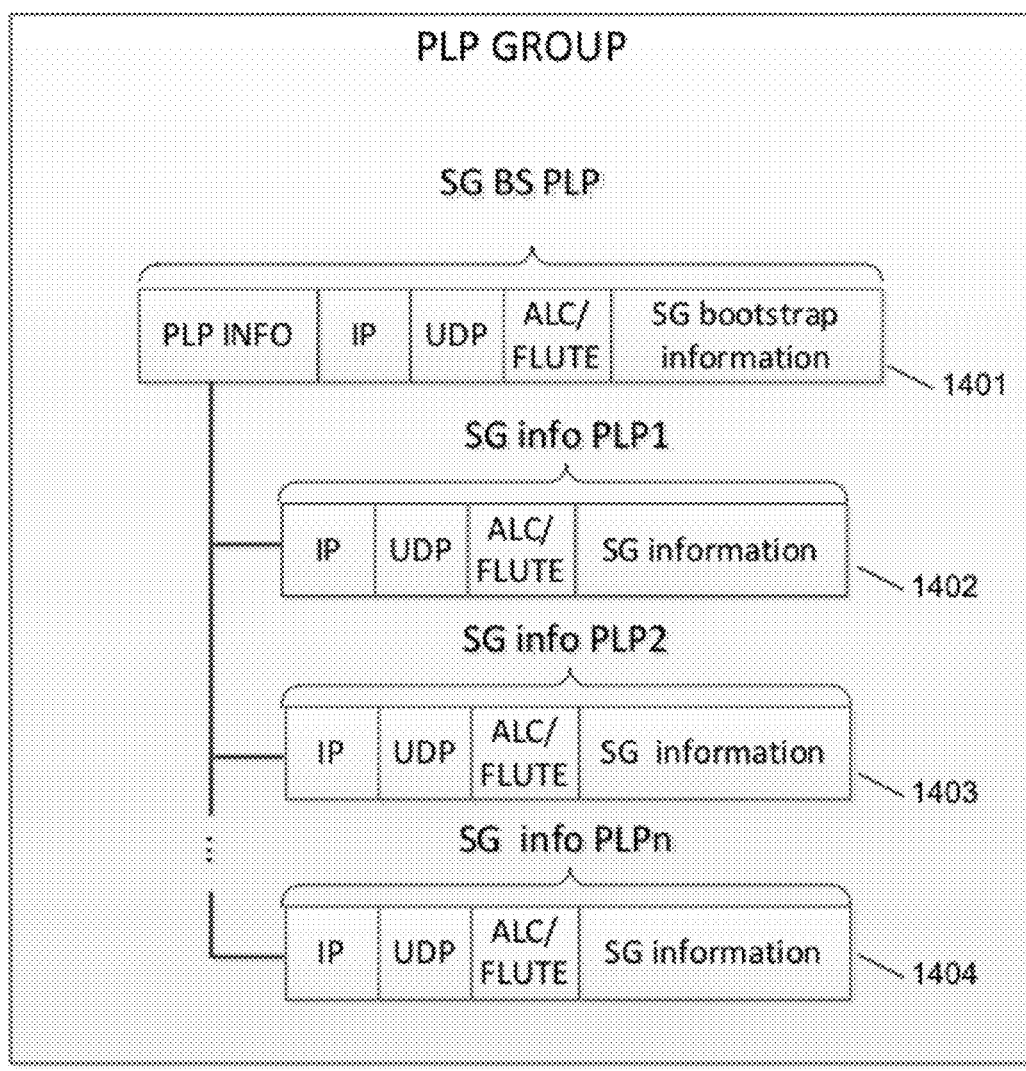
FIG. 14 illustrates an example mapping of service guide discovery information across multiple physical layer data streams within a common group of physical layer pipes.

In another variation, as illustrated in FIG. 14, the bootstrap session, announcement sessions, and delivery sessions are mapped into separate PLPs within the same group of PLPs identified with a group identifier (e.g., PLP_GROUP_ID). In such a case, the service guide bootstrap PLP1401 may be the common PLP of the group (e.g., common PLP of the physical layer frame), and the PLP1 (1402), PLP2 (1403) to PLPn (1404) may be data PLPs of the group (e.g., data PLPs of the physical layer frame). In this example, the PLP INFO header of the SG bootstrap PLP points to the other PLPs.

Figure 15:
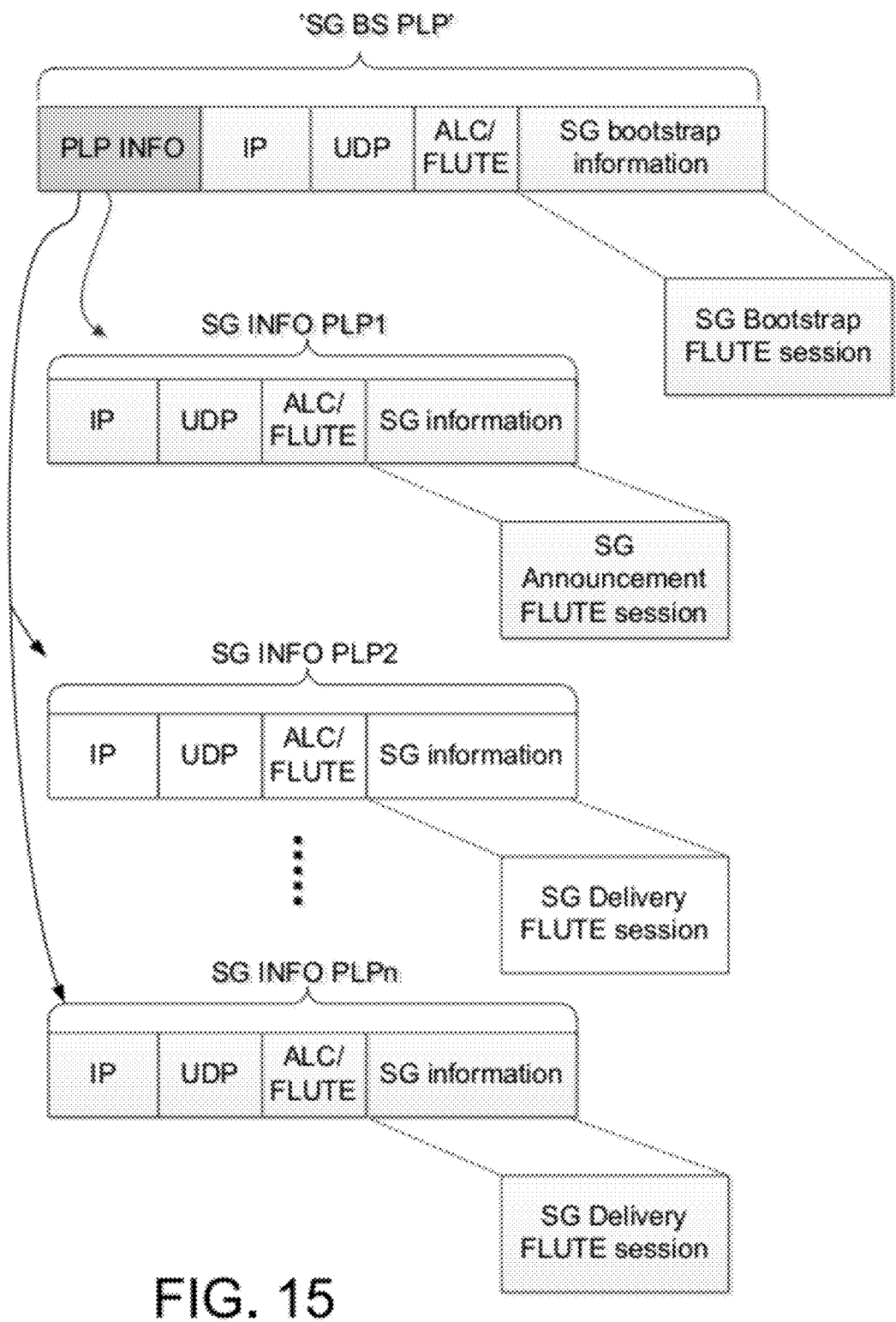
FIG. 15 illustrates an example allocation of service guide file delivery sessions into multiple physical layer data streams.

FIG. 15 illustrates an alternate view, where the PLP INFO field of the bootstrap PLP points to PLP1, which includes the service guide announcements session, and PLP2 through PLPn, which include service guide delivery sessions. The sessions may be delivered in ALC/FLUTE sessions as shown, or may be in any of the formats shown in FIG. 13. Further, in the example of FIG. 15, the PLPs may be within the same group as illustrated in FIG. 14, may be within different groups.

Returning to the process illustrated in FIG. 12, once the L1 signaling data has been inspected, the service guide bootstrap PLP is retrieved and the data therein accessed.

At this point in the process, two different operations may be performed in parallel (or alternately in serial fashion). In one path, the PLP INFO field is inspected in step 1210 to determine other PLPs containing service guide data (i.e., announcement sessions and delivery sessions). The PLPs identified in 1210 may then be retrieved by the receiving device in step 1212. Step 1214 determines whether all service guide PLPs have been retrieved, and if so, this branch of the path exits. If not, step 1212 is repeated until all service guide PLPs are retrieved. Steps 1210-1214 may be performed based on the association with the PLP group or other information within the PLP INFO field. Hence, steps 1210-1214 may proceed independently and not wait for the bootstrap information inspection in step 1216. Such procedure speeds up the overall service inspection and access to the actual services.

In the other path of the process, the service guide bootstrap information is inspected to identify one or more service guides available for download. Service guides may be selected for download to the receiving device autonomously by the device based on a set of rules (e.g., stored in a memory), or may be selected manually by a user of the electronic device. Once one or more service guides have been selected for download, the process proceeds to step 1218, to determine if all service guide information for the selected services guides have been downloaded (i.e., in step 1212). If 1218 determines that all information for selected service guides has not been downloaded (i.e., NO branch), 1218 repeats. If 1218 determines all information for selected service guides has been downloaded (i.e., YES branch), the process proceeds to step 1220. In step 1220, one or more of the downloaded service guides are rendered by the receiving device and presented to the user. The service guide may be presented in various forms, including by presenting the service guide on a display.

As previously discussed, step 1212 downloads all PLPs identified in the PLP INFO field as containing service guide information. Alternatively, 1212 may be performed after or in coordination with 1216 to download only those PLPs for service guides selected for download.

All or portions of the process in FIG. 12 may be repeated to update the selected service guide data. The service guide, including the layer 2 and upper layer signaling information contained therein may then be used to select and receive various services available on the broadcast network as previously described with respect to FIGS. 7-10.

In an alternative embodiment, the service guide bootstrap, announcement, and delivery session are carried in the same PLP. In this case, steps 1210, 1212, and 1214 may not be present in the process, since all PLP data will have been retrieved in step 1208.

Figure 16:
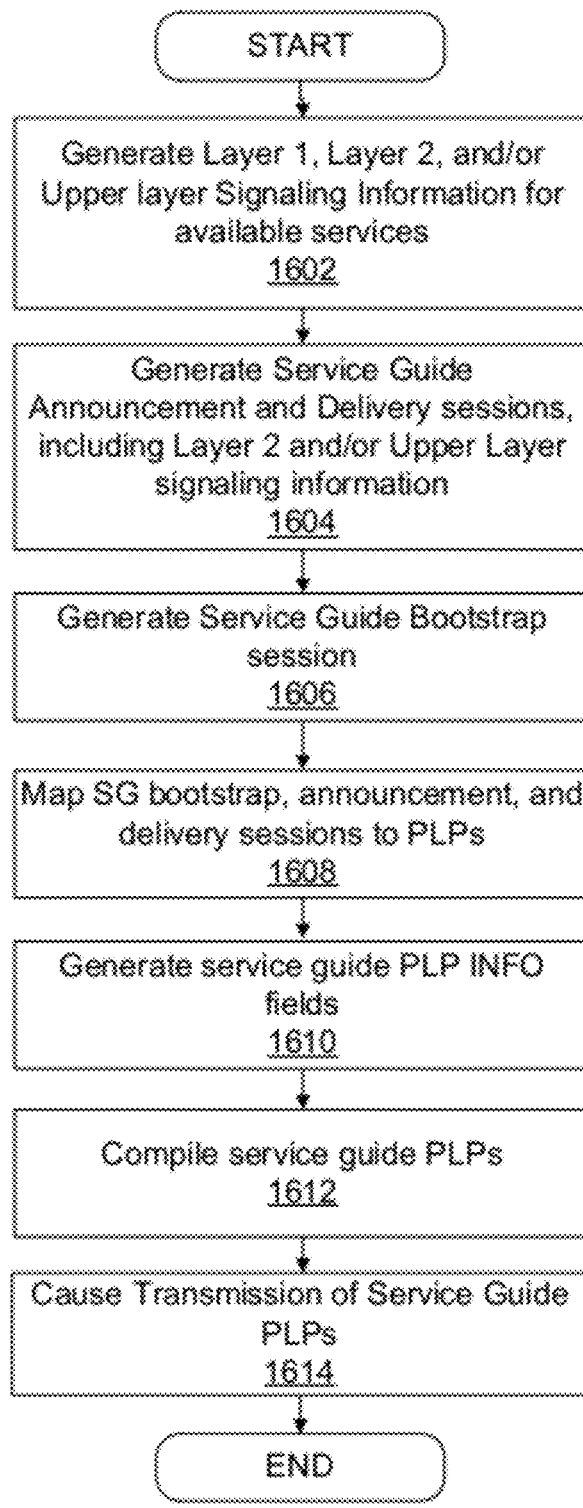
FIG. 16 illustrates an example method for generating service guide information carried within dedicated physical layer pipes.

FIG. 16 illustrates an example method for generating service guide information carried within dedicated PLPs, which may be performed by, e.g., service provider 125, content provider/server 130, digital content sources 104, and digital broadcast transmitter 103. The example method of FIG. 16 may be implemented, for example, by a processor or other element, in one or more various devices and apparatuses of a content provider and/or a service provider (e.g., service provider 125 of FIG. 1A, content provider server 130 of FIG. 1A, digital content sources 104 of FIG. 1B, digital broadcast transmitter 103 of FIG. 1B, transmitter 101 of FIG. 1B, etc.). The various devices and apparatuses may include at least one processor and at least one memory. Additionally, the various devices and apparatuses may include receiving and/or transmitting circuits and hardware interfaces (e.g., a transceiver) for the transmitting and receiving of signals from the devices and apparatuses. At step 1602, Layer 1, layer 2 and upper level signaling information is generated for available services on the broadcast system. This may include local as well as other multiplex signaling information. Step 1602 may be performed according to the process in FIG. 11. In step 1604, service guide announcement and data delivery sessions are generated for one or more service guides according to any of the previously disclosed formats, which may include the signaling date generated in 1602. The service guides may be, for example, an OMA BCAST service guide.

Once the announcement and delivery sessions are generated in step 1606 for the one or more service guides, a bootstrap session is generated for identifying the generated service guides. In step 1608, the SG bootstrap, announcement, and delivery sessions are mapped to PLPs as illustrated in FIGS. 13-15 and as discussed above. Using the mapping data from step 1608, service guide PLP INFO fields are generated for the mapped PLPs.

In step 1612, the PLP INFO fields are combined with the generated SG bootstrap, announcement, and delivery sessions to form the dedicated service guide PLPs. In 1614, the transmission of the generated PLPs at the physical layer of the broadcast system to one or more receiving devices is caused to occur (e.g., the generated information is sent to a transmitter and/or transmitter antenna for transmission).

Any of the method steps, operations, procedures or functions described herein may be implemented using one or more processors and/or one or more memory in combination with executable instructions that cause the processors and other components to perform the method steps, procedures or functions. For example, service provider 125, content provider/server 130, digital content sources 104, digital broadcast transmitter 103, antenna 101, and client devices (e.g., devices 105, 110, 115, 120, and 112) may each include one or more processors and/or one or more memory in combination with executable instructions that cause each device/system to perform operations as described herein. As used herein, the terms "processor"/"controller" and "computer" whether used alone or in combination with executable instructions stored in a memory or other computer-readable storage medium should be understood to encompass any of various types of well-known computing structures including but not limited to one or more microprocessors, special-purpose computer chips, field-programmable gate arrays (FPGAs), controllers, application-specific integrated circuits (ASICs), combinations of hardware/firmware/software, or other special or general-purpose processing circuitry.

The methods and features recited herein may further be implemented through any number of machine-readable media that are able to store machine executable instructions. Examples of machine readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses machine executable instructions or other data stored in a read only memory (ROM). In some such embodiments, the ROM stores machine executable instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of machine executable instructions read from ROM or RAM, with other operations hardwired into gates and other logic of IC. Further, the IC may output image data to a display buffer.

As used herein, machine executable instructions include instructions retrieved from a memory and executable instructions in the form of hardwired logic, and combinations of the two. A memory storing machine executable instructions include a ROM, RAM or other data storage component storing instructions that may be retrieved and executed, as well as a portion of an ASIC or other processor containing hardwired logic.

Numerous other embodiments, modifications and variations within the scope and spirit of the appended claims will occur to persons of ordinary skill in the art from a review of this disclosure and be recognized as being within the scope of the invention.

For example, other embodiments may include, but are not limited to devices and systems including means for retrieving, a physical layer pipe identifier from a device memory, the physical layer pipe identifier associated with a service guide bootstrap session; means for receiving a digital broadcast signal at the device, the received signal including a physical layer data stream identified by the physical layer pipe identifier; means for extracting, from the physical layer data stream, the service guide bootstrap session that identifies one or more service guides available for download; means for receiving a selected service guide from the broadcast system based on information in the service guide bootstrap session; and means for storing the selected service guide in the device memory. These devices and systems may further include means for extracting, from the physical layer data stream, physical layer header information that identifies one or more additional physical layer data streams containing data making up the selected service guide, wherein the selected service guide is received from the one or more additional physical layer data streams. In certain variations of these systems and devices, the broadcast system is a Digital Video Broadcast Next Generation Handheld (DVB-NGH) system, and the selected service guide is formatted according to an OMA BCAST standard.

Other embodiments may include, but are not limited to devices and systems including means for identifying one or more service guides, which identify services available on a broadcast network; means for generating a service guide bootstrap session identifying an entry point on the broadcast network for each of the one or more service guides; means for retrieving, from a memory, a physical layer pipe identifier dedicated, in the broadcast network, to indicating that a physical layer data stream is carrying the service guide bootstrap session; means for compiling the service guide bootstrap session and physical layer pipe identifier into the physical layer data stream; and means for causing the physical layer data stream to be transmitted over the broadcast network. These devices and systems may further include means for compiling, into the physical layer data stream, a physical layer header that identifies one or more additional physical layer data streams containing data making up at least one of the service guides. In certain variations of these systems and devices, the broadcast system is a Digital Video Broadcast Next Generation Handheld (DVB-NGH) system, and the selected service guide is formatted according to an OMA BCAST standard.

Still other embodiments may include, but are not limited to, software products, signals containing instructions, and computer readable memory containing software, which performs the steps of retrieving, a physical layer pipe identifier from a device memory, the physical layer pipe identifier associated with a service guide bootstrap session; receiving a digital broadcast signal at the device, the received signal including a physical layer data stream identified by the physical layer pipe identifier; extracting, from the physical layer data stream, the service guide bootstrap session that identifies one or more service guides available for download; receiving a selected service guide from the broadcast system based on information in the service guide bootstrap session; and storing the selected service guide in the device memory. These software products, signals containing instructions, and computer readable memory containing software may further perform the step of extracting, from the physical layer data stream, physical layer header information that identifies one or more additional physical layer data streams containing data making up the selected service guide, wherein the selected service guide is received from the one or more additional physical layer data streams. In certain variations of these software products, signals containing instructions, and computer readable memory, the broadcast system is a Digital Video Broadcast Next Generation Handheld (DVB-NGH) system, and the selected service guide is formatted according to an OMA BCAST standard.

Still further embodiments may include, but are not limited to, software products, signals containing instructions, and computer readable memory containing software, which performs the steps of identifying one or more service guides, which identify services available on a broadcast network; generating a service guide bootstrap session identifying an entry point on the broadcast network for each of the one or more service guides; retrieving, from a memory, a physical layer pipe identifier dedicated, in the broadcast network, to indicating that a physical layer data stream is carrying the service guide bootstrap session; compiling the service guide bootstrap session and physical layer pipe identifier into the physical layer data stream; and causing the physical layer data stream to be transmitted over the broadcast network. These software products, signals containing instructions, and computer readable memory containing software may further perform the step of compiling, into the physical layer data stream, a physical layer header that identifies one or more additional physical layer data streams containing data making up at least one of the service guides. In certain variations of these software products, signals containing instructions, and computer readable memory, the broadcast system is a Digital Video Broadcast Next Generation Handheld (DVB-NGH) system, and the selected service guide is formatted according to an OMA BCAST standard.

Although specific examples of carrying out the invention have been described, those skilled in the art will appreciate that there are numerous variations and permutations of the above-described systems and methods that are contained within the spirit and scope of the invention as set forth in the appended claims.

We claim:

1. A method comprising:
receiving at a device a digital broadcast signal from a broadcast system, the digital broadcast signal including a physical layer time slice identified by a physical layer pipe identifier, and the digital broadcast signal including layer one signaling information; identifying, based on a type field of the layer one signaling information, that the physical layer time slice contains a service guide bootstrap session;
determining, based on the layer one signaling information, a location of the physical layer time slice within a physical layer frame;
extracting, from the physical layer time slice, the service guide bootstrap session, which identifies one or more service guide sessions available for reception from one or more other physical layer time slices;
receiving the one or more service guide sessions from the one or more other physical layer time slices of the broadcast system based on information in the service guide bootstrap session; and
storing service guide information, received in the one or more service guide sessions, in a memory of the device.

2. The method of claim 1, wherein the one or more service guide sessions include a service guide announcement session, and one or more service guide delivery sessions.

3. The method of claim 2, wherein the service guide bootstrap session, the service guide announcement session, and the one or more service guide delivery sessions are Asynchronous Layered Coding/File Delivery Over Unidirectional Transport sessions.

4. The method of claim 2, wherein the service guide bootstrap session, the service guide announcement session, and at least one of the one or more service guide delivery sessions are each included within different physical layer time slices.

5. The method of claim 4, wherein the service guide bootstrap session identifies the different physical layer time slices as belonging to a common group of physical layer time slices within the physical layer frame.

6. The method of claim 1, wherein the broadcast system is a Digital Video Broadcast Next Generation Handheld (DVB-NGH) system, and the one or more service guide sessions are formatted according to an Open Mobile Alliance Mobile Broadcast (OMA BCAST) standard.

7. The method of claim 1, wherein the physical layer time slice comprises at least one time-frequency slice.

8. The method or claim 1, wherein the physical layer pipe identifier is associated in the memory with the service guide bootstrap session prior to the device receiving a service guide announcement session.

9. An apparatus comprising:
at least one processor; and
at least one memory storing computer program code, the at least one memory and computer program code configured to, with the at least one processor, cause the apparatus to:
receive a digital broadcast signal from a broadcast system, the digital broadcast signal including a physical layer time slice identified by a physical layer pipe identifier and the digital broadcast signal including layer one signaling information;
identify, based on a type field of the layer one signaling information, that the physical layer time slice contains a service guide bootstrap session;
determine, based on the layer one signaling information, a location of the physical layer time slice within a physical layer frame;
extract, from the physical layer time slice, the service guide bootstrap session, which identifies one or more service guide sessions available for reception from one or more other physical layer time slices of the broadcast system;
receive the one or more service guide sessions from the one or more other physical layer time slices of the broadcast system based on information in the service guide bootstrap session; and
store service guide information, received in the one or more service guide sessions, in the at least one memory.

10. The apparatus of claim 9, wherein the one or more service guide sessions include a service guide announcement session, and one or more service guide delivery sessions.

11. The apparatus of claim 10, wherein the service guide bootstrap session, the service guide announcement session, and the one or more service guide delivery sessions are Asynchronous Layered Coding/File Delivery Over Unidirectional Transport sessions.

12. The apparatus of claim 10, wherein the service guide bootstrap session, the service guide announcement session, and at least one of the one or more service guide delivery sessions are each included within different physical layer time slices.

13. The apparatus of claim 12, wherein the service guide bootstrap session identifies the different physical layer time slices as belonging to a common group of physical layer time slices within the physical layer frame.

14. The apparatus of claim 9, wherein the broadcast system is a Digital Video Broadcast Next Generation Handheld (DVB-NGH) system, and the one or more service guide sessions are formatted according to an Open Mobile Alliance Mobile Broadcast (OMA BCAST) standard.

15. The apparatus of claim 9, wherein the physical layer time slice comprises at least one time-frequency slice.

16. The apparatus or claim 9, wherein the physical layer pipe identifier is associated in the at least one memory with the service guide bootstrap session prior to the apparatus receiving a service guide announcement session.

17. One or more tangible computer readable memories having computer program code stored thereon, the one or more tangible computer readable memories and computer program code configured to, with at least one processor, cause an apparatus to:
receive a digital broadcast signal from a broadcast system, the digital broadcast signal including a physical layer time slice identified by a physical layer pipe identifier and the digital broadcast signal including layer one signaling information;
identify, based on a type field of the layer one signaling information, that the physical layer time slice contains a service guide bootstrap session;
determine, based on the layer one signaling information, a location of the physical layer time slice within a physical layer frame;
extract, from the physical layer time slice, the service guide bootstrap session, which identifies one or more service guide sessions available for reception from one or more other physical layer time slices of the broadcast system;
receive the one or more service guide sessions from the one or more other physical layer time slices of the broadcast system based on information in the service guide bootstrap session; and
store service guide information, received in the one or more service guide sessions, in the apparatus.

18. The one or more tangible computer readable memories of claim 17, wherein the one or more service guide sessions include a service guide announcement session, and one or more service guide delivery sessions.

19. The one or more tangible computer readable memories of claim 18, wherein the service guide bootstrap session, the service guide announcement session, and the one or more service guide delivery sessions are Asynchronous Layered Coding/File Delivery Over Unidirectional Transport sessions.

20. The one or more tangible computer readable memories of claim 18, wherein the service guide bootstrap session, the service guide announcement session, and at least one of the one or more service guide delivery sessions are each included within different physical layer time slices.

21. The one or more tangible computer readable memories of claim 20, wherein the service guide bootstrap session identifies the different physical layer time slices as belonging to a common group of physical layer time slices within the physical layer frame.

22. The one or more tangible computer readable memories of claim 17, wherein the broadcast system is a Digital Video Broadcast Next Generation Handheld (DVB-NGH) system, and the one or more service guide sessions are formatted according to an Open Mobile Alliance Mobile Broadcast (OMA BCAST) standard.

23. The one or more tangible computer readable memories of claim 17, wherein the physical layer time slice comprises at least one time-frequency slice.

24. The one or more tangible computer readable memories of claim 17, wherein the physical layer pipe identifier is associated in the apparatus with the service guide bootstrap session prior to the apparatus receiving a service guide announcement session.

* * * * *